2,955,108

PROCESS FOR 1,1,1-TRISUBSTITUTED HYDRAZINIUM CHLORIDES

George M. Omietanski, Grand Island, N.Y., assignor to The Ohio State University Research Foundation, Columbus, Ohio No Drawing. Filed Jan. 7, 1957, Ser. No. 632,942

8 Claims. (Cl. 260—205)

This invention relates to cationic organic hydrazine derivatives and method of making them. In one specific aspect, it relates to a new broad general reaction for the preparation of a class of quaternary salts known as hydrazinium chlorides.

Heretofore, quaternary hydrazinium salts have been obtained only on a laboratory scale. They have usually been prepared by the reaction of 1,1-disubstituted hydrazines with alkylating agents, frequently methyl halides. Because of the extreme difficulties involved in preparing the parent hydrazines and the limitations of the final alkylation (see O. Westphal, Berichte de Deutsche Chemische Geselschaft 74: 759 et. seq., 1365 et. seq. (1941)) the uses of hydrazinium chlorides have not been completely explored. Their various uses include commercial application as bacteriocides, detergents, polymerization initiators, catalysts, antihistaminics, anti-spasmodics, curarimimetics, and a wide range of intermediates.

The present invention offers a substantial improvement by providing a method of producing these useful hydrazinium salts on a commercial scale from readily available bases.

It is therefore an object of the present invention to provide a method for producing hydrazinium chlorides which would make them available in commercial quantities.

This application is a continuation-in-part of my now abandoned application S.N. 544,091, filed October 31, 1955. Briefly stated, my novel reaction comprises mixing chloramine with a broad class of tertiary amines to form the corresponding hydrazinium chloride and working up the reaction mixture to obtain a pure product. Specific limitations on my reaction are described hereafter in detail. At this point, it is appropriate to describe the vast range of my reaction in terms of the products which I can make; viz: the reaction of chloramine with a broad class of tertiary amines which will produce 1,1,1-trisubstituted hydrazinium chlorides having the general formula:

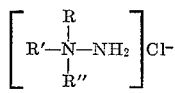

In the above formula, R may be a radical of the following types: lower alkyl, median alkyl, higher alkyl, lower alkenyl, median alkenyl, higher alkenyl, lower alkadienyl, median alkadienyl, cycloalkyl, cycloalkyl lower alkyl, polycycloalkyl lower alkyl, lower alkyl fused ring cycloalkyl lower alkyl, aryl, aryl lower alkyl, polyaryl lower alkyl, lower alkaryl, lower alkaryl lower alkyl, fused ring aryl lower alkyl, polyaryl alkyl aryl, heterocyclic, heterocyclic lower alkyl, polyheterocyclic lower alkyl, fused ring heterocyclic lower alkyl, heterocyclic aryl lower alkyl, hydroxy lower alkyl, hydroxy lower alkoxy lower alkyl, hydroxypoly lower alkoxy lower alkyl, hydroxypoly lower alkoxypoly lower alkoxy lower alkyl, hydroxyaryl, hydroxyaryl lower alkyl, hydroxy fused ring aryl, acyl lower alkyl, acyloxy lower alkyl, carbo lower alkoxy lower alkyl, aryloxy lower alkyl, alkaryloxy lower alkyl, arylalkoxy lower alkyl, polyarylalkoxy lower alkyl, aryloxyalkoxy lower alkyl, alkaryloxyalkoxy lower alkyl, arylcycloalkylalkoxy lower alkyl, arylheterocyclicalkoxy lower alkyl, cyano, cyano lower alkyl, amino lower alkyl, aminoalkylamino lower alkyl, lower alkyl amino lower alkyl, median alkylamino lower alkyl, dilower alkylamino lower alkyl, dimedian alkylamino lower alkyl, benzylideneamino lower alkyl, arylamino lower alkyl, cycloalkylamino lower alkyl, heterocyclamino lower alkyl, aryl(N-heterocyclic)amino lower alkyl, aralkyl(N-heterocyclic)amino lower alkyl, aralkylamino lower alkyl, alkyl(N-hydroxyalkyl)amino lower alkyl, alkyl(hydroxypolyalkoxyalkyl)amino lower alkyl, bis(hydroxyalkyl)amino alkyl, bis(hydroxypolyalkoxyalkyl)amino alkyl, bis(hydroxypolyalkoxypolyalkoxyalkyl)amino alkyl, acyloxyalkylamino alkyl, acyloxyalkyl(N-alkyl)amino alkyl, acyloxyalkyl(N-hydroxyalkyl)amino alkyl, bis(acyloxyalkyl)amino alkyl, acylamino lower alkyl, sulfonylamino lower alkyl, carbamyl lower alkyl, ureido lower alkyl, carboalkoxyamino lower alkyl, carbamyloxy lower alkyl, phosphonoxy lower alkyl, phosphonamido lower alkyl, silanoxy lower alkyl, titanoxy lower alkyl, boronoxy lower alkyl, alkyl thia alkyl, arylthia alkyl, arylazophenyl, haloalkyl, halomedian alkyl, halophenyl, halophenyl lower alkyl, tertnitro alkyl, nitrophenyl lower alkyl, lower alkoxyaryl, and lower alkoxyaryl lower alkyl. Likewise, R' of the above formula may be selected from the following list of radicals: lower alkyl, median alkyl, higher alkyl, lower alkenyl, median alkenyl, higher alkenyl, lower alkadienyl, median alkadienyl, cycloalkyl lower alkyl, aryl lower alkyl, lower alkaryl lower alkyl, polyaryl alkyl aryl, heterocyclic lower alkyl, hydroxy lower alkyl, hydroxy lower alkoxy lower alkyl, hydroxypoly lower alkoxy lower alkyl, hydroxypoly lower alkoxypoly lower alkoxy lower alkyl, hydroxyaryl lower alkyl, acyl lower alkyl, acyloxy lower alkyl, carbo lower alkoxy lower alkyl, aryloxy lower alkyl, alkaryloxy lower alkyl, arylalkoxy lower alkyl, aryloxyalkoxy lower alkyl, alkaryloxyalkoxy lower alkyl, cyano lower alkyl, amino lower alkyl, aminoalkylamino lower alkyl, lower alkyl amino lower alkyl, median alkylamino lower alkyl, dilower alkylamino lower alkyl, dimedian alkylamino lower alkyl, aralkylamino lower alkyl, alkyl(N-hydroxyalkyl)amino lower alkyl, alkyl(hydroxypolyalkoxyalkyl)amino lower alkyl, bis(hydroxy alkyl)amino alkyl, bis(hydroxypolyalkoxyalkyl)amino alkyl, bis(hydroxypolyalkoxypolyalkoxyalkyl)amino alkyl, acyloxyalkylamino alkyl, acyloxyalkyl(N-alkyl)amino alkyl, acyloxyalkyl(N-hydroxyalkyl)amino alkyl, bis(acyloxyalkyl)amino alkyl, acylamino lower alkyl, sulfonylamino lower alkyl, carbamyl lower alkyl, ureido lower alkyl, carboalkoxy amino lower alkyl, carbamyloxy lower alkyl, phosphonoxy lower alkyl, phosphonamido lower alkyl, silanoxy lower alkyl, titanoxy lower alkyl, boronoxy lower alkyl, alkylthia alkyl, arylthia alkyl, haloalkyl, halomedian alkyl, halophenyl lower alkyl, tertnitro alkyl, and lower alkoxyaryl lower alkyl. R" may be one of the following list of radicals: lower alkyl, median alkyl, lower alkenyl, median alkenyl, median alkadienyl, cycloalkyl lower alkyl, aryl lower alkyl, heterocyclic lower alkyl, hydroxy lower alkyl, hydroxy lower alkoxy lower alkyl, hydroxypoly loweralkoxy lower alkyl, hydroxypoly lower alkoxypoly lower alkoxy lower alkyl, acyloxy lower alkyl, carbo lower alkoxy lower alkyl, aryloxy lower alkyl, alkaryloxy lower alkyl, arylalkoxy lower alkyl, cyano lower alkyl, acylamino lower alkyl, sulfonylamino lower alkyl, carbamyl lower alkyl, ureido lower alkyl, carboalkoxy amino lower alkyl, carbamyloxy lower alkyl, phosphonoxy lower alkyl, phosphonamido lower alkyl, silanoxy lower alkyl, titanoxy lower alkyl, boronoxy lower alkyl, haloalkyl, and halomedian alkyl. The above lists are representative of R, R', and R" when they are taken to represent individual substituents. While the lists are extensive, it is obvious that there are possible variations within the spirit of the lists which are not specifically enumerated. Generally speaking, the broader terms substituted alkyl, carbocyclic, substituted carbocyclic, heterocyclic, and substituted heterocyclic are descriptive possibilities. Specific limitations will appear in the subsequent discussion. When R is an individual substituent, as described above, R' and R'' may be joined together to form a heterocyclic ring structure having at least three and not more than eight annular or endocyclic members. This ring structure may be part of a fused ring system, or may bear other residues, e.g., alkyl or hydroxy alkyl. In addition to the delineations given above, R, R' and R'' may also be taken in combination with one another. This type of fused ring system, which is termed a bridgehead nitrogen system, comprises at least two mutually fused carbon-containing rings, a resultant of having one substituent, e.g., R, share with each of the other substituents a common atom other than the quaternized nitrogen. At this point it is appropriate to clearly delimit the above formula by further definition.

A. The term "fused ring" designates a system of at least 2 and not more than 7 saturated or unsaturated organic rings wherein at least one pair of rings share two atoms. Example: brucine, with 7 rings, forms a fused ring system in which 6 of the rings are fused to more than one ring.

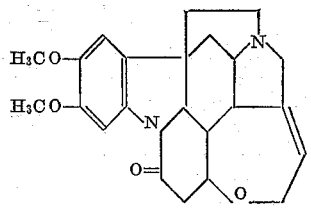

B. The term "endocyclic" means within a ring structure.

C. The term "heterocyclic" means a ring containing 1 or more atoms other than carbon (e.g. nitrogen, oxygen, Ti, S, Si).

D. The term "carbon-containing residue" for the purposes of the present invention, means a hydrocarbon chain which may or may not be coupled with an additional hetero atom to complete, in combination with a hydrocarbon chain represented by another substituent to the amino nitrogen a heterocyclic ring structure (e.g., where R' is $CH_2CH_2$—O, and R'' is $CH_2CH_2$ the resulting structure is that of morpholine).

E. Lower alkyl for the purposes of the present invention means an alkyl radical having from 1 to 7 carbon atoms.

F. Median alkyl for the purposes of the present invention means an alkyl radical having from 8 to 24 carbon atoms.

G. Higher alkyl for the purposes of the present invention means an alkyl radical having from 25 to 89 carbon atoms.

H. Trisubstitued, for the purposes of the present invention, means substituents attached directly to the amino nitrogen.

It is understood that none of the above substituents are branch chain radicals having a tertiary carbon atom (a carbon atom attached to 3 other carbon atoms) attached directly to the amino nitrogen. The immense scope of my general reaction can be appreciated from the above list of possible substituents. To repeat, these substituents are appropriately termed alkyl, substituted alkyl, carbocyclic, substituted carbocyclic, cyano, heterocyclic and substituted heterocyclic. The following description specifically sets out the necessary process conditions.

Throughout this specification where R, R' and R'' are used in structural formulas, they have meaning as set out in the foregoing definition.

SOURCE OF CHLORAMINE

In the preferred embodiment of my invention, chloramine is conveniently synthesized by the ammonia-chlorine reaction in the gas phase. This reaction is fully described by Sisler and co-workers in JACS, 76, 3096 (1954). See also U.S. 2,710,248. A generator may be constructed in accordance with the teachings of Sisler et al. to provide a continuous stream consisting essentially of chloramine and ammonia. Nitrogen may be present as a diluent in this gaseous mixture. As an alternative to this procedure, chloramine can be made by reacting chlorine with an excess of ammonia in carbon tetrachloride solution or similar halogenated hydrocarbon solvent under controlled conditions of mixing at low temperature. Such a process is fully described in U.S. Patent No. 2,678,258, to John F. Haller. Another effective procedure is fully explained in Inorganic Syntheses, volume I, 59 (1939). By variation of the aforedescribed techniques of Sisler et al., Haller, and Inorganic Syntheses, solutions of chloramine can be prepared in the medium of an unreactive organic solvent. The term "unreactive" is applied to those solvents that do not react exclusively with chloramine, ammonia, or the reactant amine added thereto. Relatively salt-free aqueous solutions of chloramine can be prepared by bubbling the product of the Sisler generator into cold water. Chloramine solutions such as that employed by Raschig and Audrieth are effective for the purposes of the present invention if the use of a sequestering agent to encourage the formation of hydrazine is omitted. The preparation of aqueous or non-aqueous solutions of chloramine by any of the above methods prior to my reaction is purely optional, since chloramine gas can be passed directly into a solution of the amine.

In all of the methods described for obtaining chloramine, ammonia is present in a ratio of at least approximately 5 mols of ammonia per mol of chloramine. This quantity of ammonia is required to stabilize the chloramine once it is formed. If less than that amount is used, the unstable and explosive nitrogen trichloride may be formed, which would materially interfere with the production of hydrazinium salts. The maximum amount of ammonia present in the reaction is limited by practical rather than theoretical considerations. It is of course possible to use an ammonia to chloramine ratio such as 250:1 and higher, although beyond this point it is doubtful if any beneficial results are obtained thereby. For experimental control of the ammonia to chloramine ratio, the relative quantity of these reactants may be ascertained from the method of chloramine preparation. The quantity of chloramine present in a sample may be readily analyzed by the potassium iodide-acid-starch-thiosulfate technique, thoroughly described in the literature.

The brown color of iodine shown on treating an aqueous acetic acid solution of potassium iodide with an effective oxidizing agent is a sensitive qualitative test for the presence of chloramine.

STRUCTURE OF THE TERTIARY AMINE

The essential limitations on the structure of the tertiary amine selected for the reaction are two. First, the effects of steric hindrance in retarding conversion of the amine to hydrazinium salt increase where branch chains and cyclic radicals are attached directly to the amino nitrogen. It is therefore not surprising that the reaction of chloramine with bis(2-ethylhexyl) hydroxyethylamine is more sluggish than with, for example, a higher molecular weight normal chain homolog, 2-hydroxyethyldioctadecylamine. As the steric effect increases, the amount of product which can be obtained by treatment with chloramine declines. Very little, if any, reaction is obtained when tertiary carbon atoms are attached directly vents, and soluble in water. Therefore, running the reaction in nitrobenzene, carbon tetrachloride and aromatics gives a precipitate of products easily washed free of amines (which are readily soluble in organic solvents generally). Some products form slowly and therefore some by-product ammonium chloride obtains in the reaction mixture. This is especially true in the case of detergent-type hydrazinium chloride where R is median to higher alkyl. Such products are often soluble in relatively non-polar solvents like chloroform; reaction in this medium permits rapid separation of ammonium chloride by filtration. Some hydrazinium salts useful as intermediates in reactions are most economically obtained in aqueous solutions, therefore it is convenient to react chloramine with a tertiary amine in water until the reaction is finished. Aqueous solutions of the hydrazinium chloride can then be used as intermediates without isolation (see Example XXXVI).

REACTION TEMPERATURE

Practical, rather than theoretical, limits are controlling. Although chloramine is thermodynamically stable up to 1000° C., its destructive reaction with ammonia (Equation 3) is catalyzed by increasing temperature and becomes appreciable at about 50° C. depending on other environmental conditions.

(3)     $3ClNH_2 + 2NH_3 \rightarrow N_2 + 3NH_4Cl$

Similarly, chloramine is known to react rapidly with liquid ammonia at a rate proportional to the temperature. Therefore, the economic limits but not the theoretical limits of temperature are between the boiling point of ammonia (−33° C.) and water (100° C.). That these are not theoretical limits is cogently shown in Example III, where a 96% yield of trimethylhydraziniumchloride was obtained on mixing hot chloramine gas directly from a generator with gaseous trimethylamine. As shown in Example I, the passage of a chloramine ammonia stream into liquid trimethylamine at −30° C. gave a good yield of the same hydrazinium chloride. Since the gas phase reaction obtains conveniently only on a small batch process and the low temperature gas liquid reaction requires the removal of large volumes of liquid ammonia, the conditions that obtain in both of these processes transcend the limits established by practical economic operation. As a matter of convenience, I prefer to use ambient temperature, even though it has been generally established that the yield of a given product increases with decreasing temperature in the range of −20 to +80° C.

REACTION PRESSURE

Pressure control again is a matter of convenience rather than necessity. Preferable pressure conditions are those at or very slightly above atmospheric temperature; although the allowable maximum extends upwardly therefrom and is controlled to a large extent by the type of equipment used. Generally speaking, if chloramine is contacted with a tertiary amine under positive or negative pressure in a continuous flow system, a decreased contact time and therefore less efficient reaction is obtained. In batch liquid reaction systems, increased pressure has been found to be advantageous, but as a rule uneconomical.

REACTION TIME AND CONVERSION

The time required to complete the chloramine tertiary amine reaction is dependent on the aforementioned factors, thoroughness of contact, and intrinsic process variations apparent to one skilled in the art. Very often, reaction of chloramine with tertiary amines has an induction period of 5 to 30 minutes. Once this period is over, the reaction proceeds at a great rate. The reaction with, for instance, trimethylamine is almost instantaneous after the short induction period is over; even dioctadecylmethylamine reacts completely within 15 to 30 minutes after the chloramine stream is stopped. When a stoichiometric quantity of chloramine is used, the end point of the reaction can be predicted by the complete loss of oxidizing power (e.g. to potassium iodide-acetic acid) of the reaction medium. Occasionally it is convenient, especially when excess chloramine is used, to let the reaction mixture set from 1 to 24 hours until all of the chloramine is consumed.

PRODUCT WORK-UP

The work-up and isolation of the product for chloramine-tertiary amine reaction depends on the characteristics of the amine, the hydrazinium chloride formed, and the end use of the product. Normally, a solvent is selected in which the amine is soluble and the hydrazinium chloride is insoluble. The chloramine is passed in and when the reaction is completed, the product is filtered off, washed and purified by standard laboratory techniques such as recrystallization. Occasionally, a product is formed which is soluble in many of the common solvents, e.g., the aminotallowmorpholinium-chloride of Example XLIV. In this case, after chlorination is completed, the reaction mixture is filtered, if necessary, free of any ammonium chloride. The product is separated from the solvent (and possibly the tertiary amine) by procedures such as extraction, distillation, recrystallization, and the like. The use of aqueous solutions as a reaction medium has already been discussed hereabove.

Table 2 shows a list of illustrative but non-limiting tertiary amines which are useful for the preparation of hydrazinium chlorides. Obviously, this list is not all-inclusive. It is merely suggestive to the skilled chemist of the great breadth of my novel reaction. In Table 2 next to the appropriate amine, I have indicated the generic type of substituent attached to the amino nitrogen.

Table 2

SUITABLE TERTIARY AMINES

Trimethylamine (symmetrical lower alkyl)
Allyldimethyl (unsymmetrical, unsaturated lower alkyl)
Isobutyldiethyl (unsymmetrical branched lower alkyl)
Tri-n-propyl (symmetrical lower alkyl)
Tris-(2-methylbutyl) (symmetrical branched lower alkyl)
Tri-n-amyl (symmetrical lower alkyl)
Methylethylhexyl (unsymmetrical lower alkyl)
Tri-n-heptyl (symmetrical lower alkyl)
Dimethyl-2-ethylhexyl (unsymmetrical median alkyl)
Diallyldecyl (unsymmetrical, unsaturated median alkyl)
Dimethyl undecenyl (unsymmetrical, unsaturated median alkyl)
Butyldidodecyl (unsymmetrical median alkyl)
Tris-dodecyl (symmetrical median alkyl)
Dimethyl (trimethylnonyl) (unsymmetrical median branched alkyl)
Methylbutenylhexadecyl (unsymmetrical, unsaturated median alkyl)
Dimethyloctadecenyl (unsymmetrical, unsaturated median alkyl)
Methyldioctadecadienyl (unsymmetrical, unsaturated median alkyl)
Dimethyleicosanyl (unsymmetrical median alkyl)
Dimethyldocosanyl (unsymmetrical median alkyl)
Cerotyldimethyl (unsymmetrical higher alkyl)
Diethylmyricyl (unsymmetrical higher alkyl)
Cyclopropyldimethyl (unsymmetrical cycloalkyl)
Dimethyl - 3 - methylcyclopentyl (unsymmetrical cycloalkyl)
Cyclohexyldiethyl (unsymmetrical cycloalkyl)
Tricyclohexyl (symmetrical cycloalkyl)
Diallylcamphenyl (unsymmetrical, unsaturated cycloalkyl)
Cyclooctadienyldimethyl (unsymmetrical, unsaturated cycloalkyl)
Phenyldimethyl (unsymmetrical aryl)
Allylmethyl-p-tolyl (unsymmetrical alkenyl aryl)
Benzylmethylphenyl (unsymmetrical aryl-aralkyl)

to the amino nitrogen. Likewise, amines having more than one cyclic group attached univalently directly to the amino nitrogen exhibit relatively little affinity toward chloramine.

Steric effects are obvious to the skilled organic chemist, although it is difficult to draw a line with mathematical exactness which would exclude amines which are inoperative for the purposes of the present invention. A proper limitation, however, takes due cognizance of the judgement of the skilled chemist. It is sufficient to say that where the amino nitrogen of the tertiary amine is blocked by steric effects to the point at which an amino group will no longer attack thereon upon contact with chloramine, amines of such structure are unsuitable.

Second, the formation of the hydrazinium chloride commonly does not obtain when heterocyclic amines in which the basic nitrogen is doubly bonded to an annular carbon which is part of a conjugated unsaturated ring system are treated with chloramine. Such compounds are generally described as having a pseudo aromatic ring structure. In each of these compounds types, the annular nitrogen in question shares a double bond with a neighboring annular carbon atom. Pyridine and quinoline are common examples of such compounds.

Basicity has less pronounced effects than would be expected. Even weak amines like triethanolamine, tris-β-chlorethylamine, and the acidic analgesic Dipyrone have been converted to the chloramine adducts.

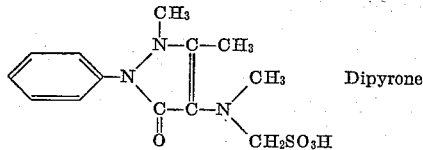
Dipyrone

REACTION MECHANISM

The reaction of chloramine with tertiary amines (Equation 1) may be pictured in terms of a mechanism analogous to the Cahn and Powell mechanism for the chloramine-ammonia reaction. (Equation 2)

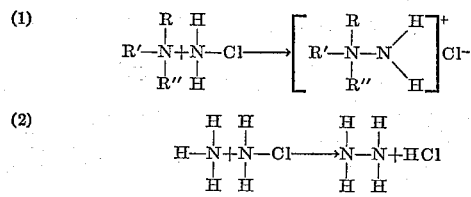

The substituents attached to the quaternized nitrogen in Equation 1 are those indicated aforesaid.

REACTANT RATIO

As previously indicated, about 5 moles of ammonia per mole of chloramine is necessary to stabilize the chloramine reactant. The ratio of chloramine to tertiary amine is governed by practical and not theoretical considerations. For instance, if chloramine is relatively cheap compared to the tertiary amine to be reacted therewith, chloramine would be used in stoichiometric quantities or even in excess to push the reaction to completion. Where the hydrazinium chloride is desired in pure form, there is no apparent advantage in using a chloramine-amine mole ratio of less than 1. A probable exception to this general rule obtains where the amine reaction with chloramine is sluggish, possibly because of the formation of measurable amounts of ammonium chloride.

If a tertiary amine, which is relatively unreactive because of its high molecular weight, is treated with chloramine too quickly, by-product ammonium chloride may be formed. Depending largely on the choice of solvent, the $NH_4Cl$ may co-precipitate with the hydrazinium chloride and necessitate the use of a purification procedure. My obvious way of preventing this occurrence is to feed chloramine into the tertiary amine solution only as fast as it will react with tertiary amine. A more practical alternate procedure is to use a limited amount of chloramine and immediately separate the hydrazinium salt after it is formed. To make this process workable, the filtrate must be adjusted to approximately the original amine to solvent ratio, re-treated with chloramine and the separation step repeated. This method has proven advantageous in large scale preparations, e.g., in pilot plant scale manufacture.

Obviously, one could waste chloramine by adding it without purpose to the converted amine, so there is no theoretical amount of chloramine which must be added to the reaction. I have found no increase in the effectiveness of conversion gained by adding chloramine in a ratio of greater than 10 moles of chloramine to 1 mole of amine. As a practical matter, rarely half that much is used. In some cases, to promote effective contact between chloramine and the tertiary amine, an excess of the amine is used as its own solvent for the reaction. In such a case, it is obvious that the chloramine to tertiary amine mole ratio is far below 1:1.

SOLVENTS AS REACTION MEDIA

Gas-liquid reaction offers advantages, for the most part, over gas-gas, liquid-liquid, gas-solid, or liquid-solid reactions. A solvent is therefore desirable if (1) the amine is not liquid, or (2) is too expensive to warrant the use of the liquid amine as its own solvent as described above. Chloramine prepared by methods other than the Sisler process is available in aqueous solution or dissolved in large quantities of halohydrocarbons. Suitable reactant amines can be added directly to such solutions to form hydrazinium salts.

The wide range of solvents applicable to my novel reaction include water (see Example IV), aliphatic hydrocarbons (Example XLIX), aromatic hydrocarbons (Example VII), alcohols (Example LXXXIII), ethers (Example XXVI), amides (Example XXXVIII), amines (Example I), heterocycles (Example CVI), and halohydrocarbons (Example XVI). Table 1 below lists specific solvents useful as reaction media:

*Table 1*

| | |
|---|---|
| water | t-butyl alcohol |
| ammonia | ethylene glycol diethyl ether |
| hexane | ethylene glycol monobutyl |
| heptane | ether |
| decane | diethylene glycol |
| kerosene | diethylene glycol |
| petroleum ether | monoethyl ether |
| ligroin | dimethylformamide |
| naphtha | dimethylacetamide |
| naphthenes | diethylaniline |
| benzene | trichlorobenzene |
| dipentene | methylene chloride |
| xylene | chloroform |
| toluene | carbon tetrachloride |
| cymene | trichlorethylene |
| mixed high boiling | acetylene tetrachloride |
| liquid aromatics | chlorobenzene |
| dioxane | nitrobenzene |
| n-amyl ether | Cellosolve |
| anisole | collidine |
| tetrahydropyran | |

It is obvious to the trained organic chemist that many other solvents would be equally suitable as reaction media, numerous others would be usable without advantage, and still others would be definitely detrimental. I have found in general, that hydrazinium chloride formation is favored by the use of polar, non-hydroxylic, non-competitive solvents. Often the choice of solvent depends less on its effectiveness in promoting the reaction than on its facilitation of the work-up procedure described hereafter. Low molecular weight products are insoluble in non-polar sol- Phenylmorpholine (aryl-heterocyclic; R and R' form a ring)
Diethyl (tetrahydro-1,1-dioxothienyl-3)- (unsymmetrical heterocycle)
Tris-2-ferryl (symmetrical heterocyclic)
Phenyl-bis-(2-chlorethyl) (aryl-haloalkyl)
Tris-(2-chloropropyl) (symmetrical haloalkyl)
Methyl (2-bromoallyl) benzyl (unsymmetrical haloalkenylaralkyl)
Dimethyl-2,4,6-triiodoaniline (unsymmetrical alkyl haloaryl)
Dimethyl-2-hydroxyethyl (dialkylhydroxy alkyl)
Diethyl-2,3-dihydroxypropyl (dialkyldihydroxy alkyl)
Dimethyl-(4-hydroxy-2-methyl butyl) (dialkyl hydroxy branched alkyl)
Allyl-bis-(2-hydroxyethyl) (alkenylbis hydroxy alkyl)
p-Bromophenylmethyl-3-hydroxybutyl (haloaryl-hydroxy alkyl)
N,N' bis-3-hydroxypropylpeperazine (heterocyclic-hydroxy alkyl; R,R' form ring)
4-(α-D-glucosyl)morpholine (heterocyclic-hydroxy alkyl; R and R' form ring)
3-(bis-β-hydroxypropyl)aminothianaphthene (heterocyclic-hydroxy alkyl)
Bis - (β - hydroxyethoxyethyl)octadecenyl (hydroxyalkyl alkyl ether)
β - Benzhydryloxyethyl dimethylamine (alkyl aralkyl ether)
3 - nitrophenoxymethyldimethylamine (alkyl nitroaryl ether)
Carboethoxyethyl dimethylamine (alkyl ester of amino alkyl acid)
Benzoyloxy ethylmorpholine (heterocyclic alkyl ester of aromatic acid)
Diethylaminoethyl phenyl-1,1-trimethylineacetate (amino alkyl esters of di-carbocyclic alkyl)
Lobeline (alkyl ketoheterocycle)
Noval ketone (dialkyl ketone)
Phenacyldimethylamine (aryl alkyl ketone)
Dimethylaminoacetanilide (arylamide of alkyl amino acid)
4-(lauroylamino)diethylaniline (fatty acid amide of aryl diamine)
Ethyl 4-(dimethylamino)carbanilate (alkyl ester of aminoarylurethan)
4-(dimethylaminobenzoyl)urea (amino aryl acid ureide)
N,N-Bis(4,4-dimethylaminophenyl)-N,N'-diethylurea (di-(amino aryl)urea)
Dimethylcyanamide (cyanamino alkyl)
2,2 - diphenyl - 5 - morpholinohexylnitrile (heterocyclic amino diaryl alkyl nitrile)
2-nitro-2-dimethylaminopropane (nitroalkylamine)
N,N,N',N' - tetra(2-hydroxyethyl - ethylenediamine (hydroxyamino alkyl amine)
N-pyridyl-N-(4-nitrobenzyl)-N',N'-dimethyl ethylenediamine (amino alkyl dialkyl amine)
Aminoethylpiperazine (aminoalkyl heterocycle)
Furylideneaminopropyldiethylamine (Schiffs base derivative of amine)
Dimethylaminoethyl mercaptan (mercaptan)
Morpholinomethylthiabenzene (heterocyclic sulfide)
N',N',N⁴N⁴-tetramethylsulfanilamide (arylsulfanamide)
N-benzenesulfonyl - N,N',N' - trimethylpropylenediamine (arylsulfonamide)
Diethyl 2-dimethylaminoethylphosphate (P acid-ester)
Diethyl N-diethylaminoethylphosphamate (P acid-ester-amide)
Tetra-(2-piperidinopropyl)silicate (silane)
Tetra-(2-piperidinopropyl)titanate (titanium ester)
Triethanolaminoborate (boric acid ester)
Quinuclidine, reserpine, sparteine (bridgehead)

Certain of the products obtained by my reaction may be more descriptively termed chloramine adducts. For instance, in Equation 4, shown below, the product could be variously described as the chloramine adduct of methylmorpholine, the hydrazinium chloride of methylmorpholine, or 4-amino-4-methylmorpholiniumchloride.

(4) 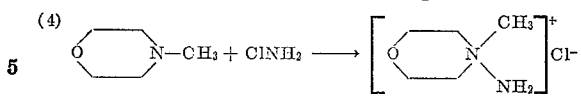

It is in any event a hydrazinium chloride.

PRODUCT CHARACTERIZATION

To assist in identification and characterization, it is frequently necessary to convert hydrazinium chlorides to pure crystalline derivatives which retain the hydrazinium cation. The melting points, crystal habits, X-ray diffraction patterns and elemental analyses of these derivatives can then serve as proof of the identity of the original hydrazinium chloride. Ideally, a single, inexpensive derivatizing reagent would yield, quickly and quantitatively, pure, uniquely characteristic products merely on addition to a solution of the quaternized hydrazinium salt. I have found that potassium hexafluorophosphate approaches this ideal of characterization. Addition of a saturated aqueous solution of $KPF_6$ to aqueous hydrazinium chloride solutions produces quickly a precipitation of the hydrazinium hexafluorophosphate in good to excellent yields. (Equation 5)

(5) 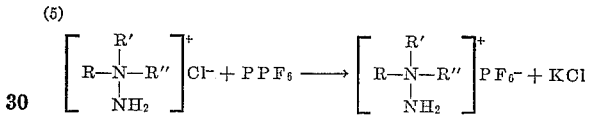

These novel salts are crystalline, non-hygroscopic, and readily recrystallizable. They have characteristic and reproducible crystal habits and melting points. They are therefore eminently suitable as derivatives.

The present invention is further illustrated by the following non-limiting examples.

EXAMPLE I

By the well known process described in U.S. Patent No. 2,710,248 of Harry H. Sisler et al., chloramine (or monochloramine) is prepared by the vapor phase reaction of chlorine and ammonia. A generator was constructed to prepare gaseous mixtures of chloramine, ammonia, and nitrogen using this process.

Such a gaseous chloramine mixture was bubbled into liquid trimethylamine at about $-30°$ C. A white solid, which was hygroscopic in nature, precipitated as the reaction progressed. This product, crude 1,1,1-trimethylhydrazinium chloride, contained 1–2% of ammonium chloride and subsequently was purified by recrystallization of an alcohol-ethyl acetate mixture. The purified material melted at about 245° C., with decomposition. Upon anaylsis, the following results were obtained: Found: percent C, 31.78, 31.77; percent H, 9.87, 9.96; percent N, 25.24, 25.01; percent Cl, 32.78, 32.84. Calculated for 1-1-1-trimethylhydrazinium chloride: 32% C, 10.02% H, 25.33% N, 32.06% Cl. The yield obtained was 95% based on the amount of chloramine used in the reaction mixture. The preparative reaction is shown in Equation 6, below.

(6) 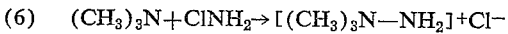

EXAMPLE II

The product of Example I was treated with hydriodic acid (sp. gr. 1.5) by adding the HI to a saturated ethanol solution of the hydrazinium salt. The material was recrystallized from an ethanol-ethyl acetate mixture. The product thus obtained was in the form of pearly plates melting at 235° C. with decomposition. The literature value (see Harries and Haga, Berichte de Deutsche Chemische Gesellschaft 31, 58 (1898)) for 1,1,1-trimethylhydrazinium iodide is in accord with this result. Analysis of the derivative gave the following results: Found: percent C, 17.79, 17.72; percent H, 5.71, 5.46; percent N, 13.88, 13.85; percent I, 63.00, 62.88. Calculated for 1,1,1-trimethylhydrazinium iodide: 17.83% C, 5.48% H, 13.86% N, and 62.81% I.

EXAMPLE III

The trimethylamine-chloramine reaction was also carried out in vapor phase. The apparatus used consisted of an extended glass tube with appropriate inlets affixed thereto. A gaseous stream of chloramine, ammonia, and nitrogen was introduced at one end of the tube and allowed to pass through a mass of glass wool which served as the filter for the ammonium chloride. Trimethylamine vapor was introduced into the tube and contacted with the chloramine gas stream. The product was deposited on a second mass of glass wool. It was observed that the reaction occurred on the glass surfaces of the reaction chamber. The product was collected from the reaction chamber, separated from the ammonium chloride and converted to the iodide for identification. Found: percent C, 17.83, 17.83; percent H, 5.46, 5.59; percent N, 13.68, 13.71; percent I, 62.99, 63.0. Calculated for 1,1,1-trimethylhydrazinium iodide, 17.83% C, 5.48% H, 13.86% N, and 62.81% I. A 96% yield of the parent hydrazinium chloride was obtained based on the amount of chloramine used during the reaction.

EXAMPLE IV 1,1,1-trimethylhydrazinium chloride was also obtained by passing a chloramine-ammonia gas stream through 75 ml. of commercial 25% aqueous trimethylamine for 90 minutes (giving approximately a 3:1 chloramine:trimethylamine mole ratio). A strongly exothermic reaction occurred which, in even an ice bath, kept the temperature of the reaction mixture at 20° C. The chloramine was destroyed on contact with the solution, but no hydrazine was obtained. The clear, colorless reaction mixture was evaporated to dryness. The residue, 18.2 g. of a white, highly hygroscopic solid was at least 40% 1,1,1-trimethylhydrazinium chloride by chloride titration, the rest being ammonium chloride. It was identified by conversion to the iodide.

EXAMPLE V

A gaseous chloramine-ammonia mixture was bubbled into liquid triethylamine at about 20° C. As the reaction progressed, a crystalline, exceedingly hygroscopic solid, precipitated from the reaction mixture. It was recrystallized several times from a chloroform-ether mixture. The purified crystals, which melted at 177–178° C., represented a virtually quantitative yield of the hydrazinium chloride. Analysis of these crystals gave the following results: Found: percent C, 47.21; percent H, 11.30; percent N, 18.25; percent Cl, 23.30. Calculated for 1,1,1-triethylhydrazinium chloride: 47.2% C, 11.2% H, 18.3% N, and 23.2% Cl.

EXAMPLE VI

An alcoholic solution of the 1,1,1-triethylhydrazinium chloride obtained in Example V was treated with a saturated solution of picric acid and alcohol at about 25° C. On standing, long yellow needles formed slowly in the mixture. These needles were recrystallized from absolute ethanol to give a product which melted at 214–215° C. with decomposition. Analysis of the yellow needles gave results corresponding to the 1,1,1-triethylhydrazinium picrate, thus confirming the presence of 1,1,1-triethylhydrazinium chloride in the reaction mixture.

EXAMPLE VII 50 ml. of triethylamine were dissolved in 200 ml. of xylene. A chloramine-ammonia gas stream was added thereto for 90 minutes at a temperature between about 20–30° C. 72% conversion of the triethylamine was obtained based on chloramine. The hydrazinium salt thus formed was 96% pure.

EXAMPLE VIII

An excess of 1-tri-n-propylamine was treated with a chloramine-ammonia gas stream. 5.9 g. of crude 1,1,1-tripropylhydrazinium chloride, containing 0.2 g. of ammonium chloride, were obtained therefrom. This product represented 86% of a theoretical yield of 1,1,1-tripropylhydrazinium chloride, M.P. 143–145° C.

EXAMPLE IX

The product of Example VIII was treated with potassium hexafluorophosphate to give the corresponding hydrazinium hexafluorophosphate, M.P. 202.5–203.5° C. The analysis of this derivative was as follows: percent C, 35.49, 35.52; percent H, 7.83, 7.72; percent N, 9.38, 9.30; percent P, 10.01, 9.94. Calculated for 1,1,1-tripropylhydrazinium hexafluorophosphate: 35.52% C, 7.62% H, 9.21% N, and 10.17% P.

EXAMPLE X

The procedure of Example I was repeated using tri-n-butylamine. As the reaction progressed a pasty solid separated from the reaction mixture. The solid appeared to contain a considerable amount of tri-n-butylamine that could not be removed by treatment with ether. The solid was treated with absolute alcohol and filtered; it was very largely ammonium chloride. From the filtrate was obtained on evaporation crude 1,1,1-tributylhydrazinium chloride.

EXAMPLE XI

An alcohol solution of the crude product of Example X was treated with potassium hexafluorophosphate. The hexafluorophosphate thus obtained was recrystallized from an alcohol-water mixture. This product, 1,1,1-tri-n-butylhydrazinium hexafluorophosphate, melted at 87.5–88.5° C. Analysis of the material gave the following results: Found: percent C, 41.75, 41.80; percent H, 8.64, 8.45; percent N, 8.36, 8.17; percent P, 9.04, 9.0. Calculated for 1,1,1-tributylhydrazinium hexafluorophosphate: 41.67% C, 8.44% H, 8.09% N, and 8.94% P.

EXAMPLE XII

The procedure of Example I was substantially repeated using tri-n-hexylamine. The reaction was mildly exothermic and the reaction mixture showed a tendency to foam toward the end of the experiment. The raw solid was treated with absolute alcohol and filtered. From the filtrate was obtained on evaporation crude 1,1,1-trihexylhydrazinium chloride.

EXAMPLE XIII

An alcohol solution of the product of Example XII was treated with potassium hexafluorophosphate. The product obtained therefrom was recrystallized from a water-alcohol mixture and melted at 80–81° C. Analysis of the material gave the following results: Found, percent C, 50.22; percent H, 9.65; percent N, 6.44; percent P, 7.26. Calculated for 1,1,1-trihexylhydrazinium hexafluorophosphate: 50.22% C, 9.60% H, 6.51% N, and 7.19% P.

EXAMPLE XIV

The procedure of Example I was substantially repeated using tri-n-heptylamine. The reaction was begun at 25° C. and proved to be sufficiently exothermic to raise the temperature to 40° C. at the end of 30 minutes. As the reaction proceeded, a solid precipitated therefrom. Addition of petroleum ether (boiling from 30–60° C.) to the supernatant liquid caused further precipitation. The raw solid was treated with ethyl acetate and the residue was recrystallized from a water-alcohol mixture. Evaporation of the ethyl acetate extract gave a crude solid. Further recrystallization of this crude material from a petroleum ether ethyl acetate mixture gave glistening plates melting at 65.5°–66° C. Analysis gave the following results: Found, percent C, 69.56; percent H, 13.11; percent N, 7.71; percent Cl, 9.68. Calculated for 1,1,1-triheptylhydrazinium chloride: 69.47% C, 13.05% H, 7.71% N, and 9.76% Cl.

EXAMPLE XV

The hexafluorophosphate of the product of Example XIV was prepared by treating a concentrated solution of the chloride in water and methyl alcohol with a saturated solution of potassium hexafluorophosphate in water. The 1,1,1-tri-n-heptylhydrazinium hexafluorophosphate was recrystallized from an alcohol-water mixture. The crystals melted at 98–99° C. Analysis showed the following: Found: percent C, 53.32; percent H, 9.98; percent N, 5.88; percent P, 6.62. Calculated for 1,1,1-tri-n-heptylhydrazinium hexafluorophosphate 53.37% C, 10.02% H, 5.93% N, and 6.55% P.

EXAMPLE XVI

A mixture of tertiary amines of the formula $RN(CH_3)_2$ where R is a mixture of alkyl radicals derived from a commercial palmitic acid fraction, available commercially as "Armeen DM16." The distilled grade of this product, Armeen DM16D, contains about 95% tertiary amine, the single long chain of which is approximately 92% hexadecyl, 7% octadecyl, and 1% octadecenyl. 15 g. of this product in 200 ml. of trichloroethylene were treated with approximately 5 g. of chloramine in a chloramine-ammonia gas stream for 53 minutes. There was no immediate heat of reaction, but a white solid formed slowly. Approximately 15 minutes after chloramine addition had been completed, the temperature of the reaction mixture rose spontaneously to almost 40° C. Filtration at room temperature gave 19.0 g. of a white solid, melting at 226–237° C., soluble in water, which was identified as the crude hydrazinium chloride. The major impurity in the product mixture was found to be ammonium chloride. The hydrazinium salts thus obtained are a mixture of hexadecyldimethyl, octadecyldimethyl, and octadecenyldimethyl hydrazinium chlorides in a weight ratio of approximately 92:7:1, representing a yield of 83% of theory. The pure product, recrystallized from ethyl acetate, runs clear at about 140° C.

EXAMPLE XVII

An amine similar to that of Example XVI, available commercially as "Armeen DMS" has the same general formula (where R is a mixture of alkyl and alkenyl residues derived from soybean fatty acids and has approximately the composition 20% hexadecyl, 17% octadecyl, 26% octadecenyl, and 37% octadecadienyl). 20 g. of this amine were dissolved in 50 ml. of xylene. This solution was treated with the chloramine-ammonia gas mixture prepared by the generator described in Example I. This reaction mixture gave as a product a solvent-insoluble tan solid melting at 208–240° C. The water-soluble product forms a hexafluorophosphate which decomposes at 175° C.

EXAMPLE XVIII

An amine similar to that used in Example XVII available commercially as "Armeen DM18" has a long chain derived from technical stearic acid; it therefore has a composition of alkyl groups of approximately 7% hexadecyl, 90% octadecyl, and 3% octadecenyl. The commercial base is 85% amine. A chloramine-ammonia gas stream was bubbled into 25 g. of this amine in 200 ml. of trichlorethylene at 25–30° C. The mixture was kept saturated with the gas stream for 52 minutes, during which time a solid precipitated. After the chloramine addition was completed, the reaction mixture was allowed to stand for thirty minutes; in the interim there was a spontaneous temperature rise to about 38° C. 16.4 g. of a white solid product representing of yield of 62.1% of theory were separated from the solution by filtration. The chief constituent of the product was octadecyl dimethylhydrazinium chloride, melting at 222° C. with decomposition.

EXAMPLE XIX

An amine available commercially as "Armeen M2C" is approximately 84% $R_2NCH_3$ and 5% $R_3N$, where R is approximately 8% octyl, 9% decyl, 47% dodecyl, 18% tetradecyl, 8% hexadecyl, 5% octadecenyl, and 5% octadecyl. The amine is a viscous yellow liquid with a combined molecular weight of 389 for the mixture of tertiary amines, or 436 for the overall product. The mixture of 700 g. of M2C in 2 gallons of benzene was subjected for two and three quarter hours to a flow of 0.04 mole of chloramine per minute. As soon as the reaction was completed, the mixture was warmed slightly, filtered free of ammonium chloride, treated with an equal volume of heptane and evaporated. From the filtrate was obtained, after vacuum drying at 100° C., 650 g. of tan methyldicocohydrazinium chloride

as a major component where R in the formula has the significance indicated above. Physically, the product appeared as a soft wax which, unpurified, contained practically no amine and very little ammonium chloride. On the basis of 89% tertiary amine the yield obtained was 92% of theory.

EXAMPLE XX

An amine known commercially as "Armeen M2HT" is 86% $R_2NCH_3$ and 6% $R_3N$, where R is a hydrocarbon chain, derived from hydrogenated tallow fatty acids, containing approximately 30% hexadecyl and 70% octadecyl residues. The combined molecular weight of this product is about 4.2. The parent amine mixture, partially dissolved in approximately twice its weight of xylene, was treated with a chloramine-ammonia gas stream. During the chloramine addition, the base dissolved immediately, and after a few minutes a waxy emulsion appeared in the reaction mixture. The formation of this emulsion was accompanied by a temperature rise from 30 to 73° C. After cooling the mixture to room temperature, it was difficult to filter. A waxy solid was obtained by filtration after a xylene wash. The solid was a mixture of 12 parts $NH_4Cl$ and 88 parts of the hydrazinium salts, chiefly methyl-bis-octadecylhydrazinium chloride

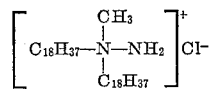

representing 63% of the theoretical yield of the desired product. This new compound was an amorphous white wax which could be recrystallized from water. It was moderately to very soluble in chloroform and recrystallizable from many other solvents. It yielded the characteristic derivatives with $KPF_6$ and $KHGI_3$. The pure product ran clear at about 160° C., first showing a phase change at about 90° C.

EXAMPLE XXI 20 ml. of diethylcyclohexylamine dissolved in 100 cc. xylene was treated with the chloramine-ammonia-nitrogen gas stream. A precipitate formed as the reaction progressed. 20.2 g. of 1-cyclohexyl-1,1-diethylhydrazinium chloride representing an 85.5% yield of theory. Hydrazinium chloride was separately recovered from the reaction mixture. This hydrazinium salt had a melting point of 169–172° C. and it formed a hexafluorophosphate, melting point, 120° C.

EXAMPLE XXII

The chloramine-tertiary amine reaction was carried out in a manner similar to that of Example I at about 25° C., using N,N-dimethylaniline. The reaction solid was recrystallized from an ethanol-ether mixture with the resulting product appearing as long, flat needles. The solid melted at 187–188° C. with decomposition, which corresponds to the literature value for this product. The product was identified as 1,1,1-dimethylphenylhydrazinium chloride. The yield was quantitative.

EXAMPLE XXIII

The product of Example XXII was converted to the hexachloroplatinate by a method described in the literature. The resulting yellow prisms melted at 156–157° C. which corresponds to the reported melting point for this material.

EXAMPLE XXIV

A chloramine-ammonia gas stream from the generator was bubbled into N-ethyl-N-methylaniline at about 30° C. From 7.3 g. of the raw solid, about 0.3 g. of alcohol insoluble residue was obtained. The percent yield was 99% based on the amount of alcohol insoluble $NH_4Cl$. The 1-ethyl-1-methyl-1-phenylhydrazinium chloride was recrystallized from alcohol-ethyl acetate mixture. The crystals melted with decomposition at 167–168° C. The material analyzed as follows: Found: percent C, 56.22, 56.27, 56.26; percent H, 7.79, 8.00, 7.79; percent N, 15.04, 15.12; percent Cl, 20.21, 20.22. Calculated for 1-ethyl-1-methyl-1-phenylhydrazinium chloride: 57.90% C, 8.10% H, 15.00% N, and 19.00% Cl.

EXAMPLE XXV

The chloramine-ammonia gas stream was bubbled into 100 ml. of diethylaniline at about 25° C. for one hour. The yield of raw product was 1.9 g. Addition of ether to the filtrate caused the additional precipitation of 0.2 g. of raw product. The combined solids were treated with 25 ml. of absolute alcohol. The alcohol-insoluble residue, 0.3 g., gave qualitative tests for ammonium and chloride ions. The yield of alcohol-soluble 1,1-diethyl-1-phenylhydrazinium chloride was 65%.

EXAMPLE XXVI

The reaction of Example XXV was run in 50% by volume ether solution at about −10° C. The yield of hydrazinium chloride decreased to 18%. The product was recrystallized from an alcohol ether solution to give crystals which melted with decomposition at 197–198° C.

EXAMPLE XXVII

A hot aqueous solution of the hydrazinium chloride of Example XXVI was treated with a concentrated aqueous solution of chloroplatinic acid. Upon cooling, the yellow-orange needles which formed were filtered, washed with cold water and dried. They melted at 167–168° C. with decomposition.

EXAMPLE XXVIII

The hydrazinium salt of Example XXV was treated with potassium hexafluorophosphate in the usual manner and was recrystallized from hot water. The crystals melted at 110–111° C.

EXAMPLE XXIX

Chloramine was reacted in the manner of Example I at about 25° C. with N,N-di-n-propylaniline. The resulting solid could not be freed from the amine by washing with ether. The presence of 1,1-di-n-propyl-1-phenylhydrazinium chloride in the raw solid was ascertained by means of hexafluorophosphate. The 1,1-dipropyl-1-phenylhydrazinium hexafluorophosphate was recrystallized from hot water and pale green crystals were obtained. They melted at 135–136° C.

EXAMPLE XXX

Chloramine was reacted in the usual manner (like Example I, no solvent) with N,N-dimethyl-p-toluidine. The resulting solid was completely soluble in absolute alcohol. The yield of 1,1-dimethyl-1-p-toluylhydrazinium chloride appeared to be quantitative. The product was recrystallized in absolute alcohol to give crystals melting with decomposition at 165–166° C.

EXAMPLE XXXI

A chloramine-ammonia gas stream was bubbled into liquid N-ethylpiperidine at 25° C. As the reaction proceeded, the novel 1-amino-1-ethylpiperidinium chloride precipitated. The product was found to be contaminated with a considerable amount of ammonium chloride. For purposes of identification, 1-amino-1-ethylpiperidinium picrate was prepared from the chloride by metathesis. The picrate melted at 193–195° C.

(7) 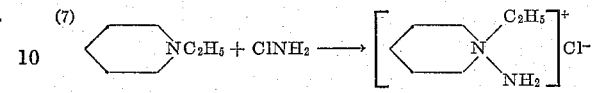

EXAMPLE XXXII

N-methylmorpholine in xylene was treated with gaseous chloramine and ammonia to give 14.9 g. of a brown crystalline solid, which was xylene-insoluble. The product, 4-amino-4-methylmorpholinium chloride, melting at 196–198° C., represented at 55% yield of 99% pure 4-amino-4-methylmorpholinium chloride.

EXAMPLE XXXIII

A commercial grade N-ethylmorpholine was purified by distillation, collecting the portion boiling at 138° C. The gaseous chloramine-ammonia mixture was passed into this solvent-free fraction causing nearly all of the N-ethylmorpholine to be converted into a solid. A portion of the product thus obtained was converted to the hexafluorophosphate derivative. The novel 4-amino-4-ethylmorpholinium hexafluorophosphate melted at 179.5–180° C.

EXAMPLE XXXIV

A commercial grade nicotine was treated with a chloramine-ammonia gas stream at about 27–30° C. It was found that chloramine reacts with nicotine in an exothermic reaction to form a semi-solid paste which was insoluble in ether and very soluble in water and alcohol. The semi-solid mass darkened upon exposure to the atmosphere and was hygroscopic. The novel product, 8-aminonicotinium chloride, became somewhat crystalline after standing in a sealed vial for a period of two months.

(8) 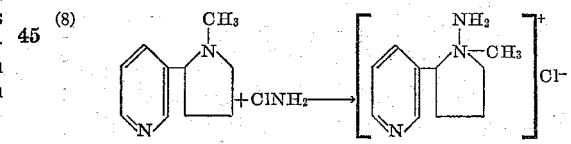

EXAMPLE XXXV

A chloramine-ammonia mixture from the generator was passed into 150 ml. of a 10% aqueous solution of hexamethylenetetramine. The chloramine was consumed quickly and almost quantitatively by the solution, resulting in an exothermic reaction. Evaporation of the clear, light yellow solution gave 20.8 g. of hygroscopic, off-white solid, containing ionic chloride, and acting in alkaline solution, as a strong reducing agent. Standard quantitative tests establish that this was a mixture of ammonium chloride and the desired product, 1-aminomethenaminium chloride. The solid mixture decomposed at 190–196° C. As determined by chloride titration, it represented a 79% yield of 78% pure 1-aminomethenaminium chloride. Its probable structure is given in the preparative reaction (Equation 9).

(9) 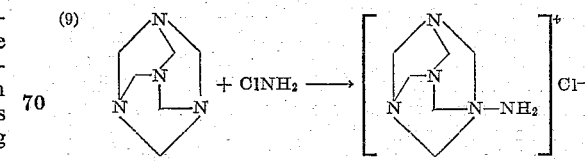

Partial extraction of this substance with 2-propanol gave a crude solvent soluble product relatively free of ammonium chloride, melting at 167–180° C. Recrystallization of this partially pure hydrazinium chloride from 2-propanol-chloroform mixtures gave a crystalline tan product, which decomposed at 207–208° C.

EXAMPLE XXXVI

When a portion of the aqueous solution of Example XXXV was not evaporated, but boiled with an equal volume of a freshly prepared 10% phenolformaldehyde resole solution (a water soluble, low molecular weight phenol-formalin polymer), a water insoluble light orange polymer was formed which showed an ion exchange properties.

EXAMPLE XXXVII

The reaction of Example XXXV was repeated in anhydrous solution by treating a 10% chloroform solution of hexamethylenetetramine with 0.8 equivalents of chloramine from the generator for twenty minutes. The white product was quickly filtered, washed with chloroform, and vacuum dried at room temperature for 24 hours. The resulting compound represented a 72% yield of a 95% pure product decomposing with gas evolution at about 140° C. Attempts to push the reaction to completion yielded more ammonium chloride. The product was called aminomethenaminium chloride since hexamethylene tetramine is commonly called methenamine. It was very readily water soluble, soluble in methanol and less soluble in other solvents. Upon hydrolysis, it yielded formaldehyde, ammonium chloride, and yellow to orange water-insoluble solids. It forms a hexafluorophosphate that decomposes at about 203° C.

EXAMPLE XXXVIII

A solution of 25.9 g. of quinine in 150 ml. dimethylformamide was treated with the chloramine gas stream from the generator. A white solid precipitated from the reaction mixture as the reaction progressed. The 5.6 g. of initial precipitate, a white solid melting above 280° C., represented a 4.7% yield of crude product, N-aminoquininium chloride, combined with about 3 times its weight of $NH_4Cl$. Evaporation of the filtrate yielded almost 50% of the desired product, which was freed of quinine contaminant by solution in water. Recrystallization from a modicum of water gave light brown needles, melting at 166–168° C. with decomposition. Quinine, soluble to the extent of 0.15% in boiling water, decomposing at 171–175° C., gives a mixed melting point of 157–165° C. with the product. The hydrazinium hexafluorophosphate derivative decomposes without definitive melting point at 200° C. The structural formula of the novel hydrazinium chloride is shown hereunder.

Aminoquininium Chloride:

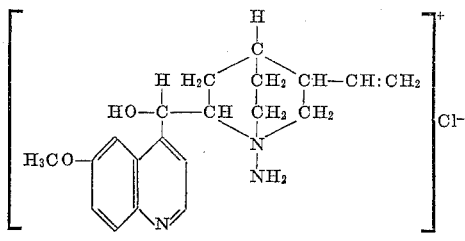

EXAMPLE XXXIX

A gaseous mixture of chloramine and ammonia, described in Example I, was passed into 20 g. of brucine and 250 ml. of dimethylformamide. A white solid precipitated as the reaction proceeded. The solid portion was separated from the reaction mixture by filtration. Drying of this material gave 11.1 g. of crystalline off-white solid, which, by chloride titration, was a 13.7% yield of mixed chlorides. The desired product, N-aminobrucinium chloride, was combined therein with roughly three times its weight of ammonium chloride. Evaporation of the reaction filtrate yielded an additional 22 g. of the hydrazinium salt, almost 80% pure by chloride titration, resulting in an overall yield of about 85%. The novel bridgehead hydrazinium chloride which was recrystallized from the absolute alcohol formed white crystals melting at 261–263° C., with sublimation at about 180° C. This bridgehead hydrazinium salt is highly water-soluble, and relatively insoluble in chloroform (the parent alkaloid, brucine, shows reverse solubilities).

EXAMPLE XL

The hydrazinium salt of Example XXXIX was treated in aqueous solution with potassium hexafluorophosphate to give the corresponding hexafluorophosphate which, when separated, decomposed with gas evolution at 204° C., with sublimation above 178° C.

EXAMPLE XLI

A chloramine-ammonia gas mixture was passed into 20 ml. of β-hydroxyethylmorpholine and 50 ml. of xylene for 47 minutes. Because this reaction was exothermic, use of a cold water bath was required to maintain the temperature at approximately 30° C. The copious white precipitate that formed during gasification blocked the inlet tubes and necessitated cutting the reaction period short. Use of an agitator and increased amounts of solvent eliminated this difficulty in subsequent runs. The filtered, washed and dried solid, weighing 14.6 g., consisted of glistening off-white plates, melting at 149–152° C. By chloride titration, it represented 96% pure 4-amino-4-(2-hydroxyethyl)-morpholinium chloride. The amount of product obtained represented approximately 60% of the theoretical yield. Two recrystallizations from absolute alcohol gave transparent, gleaming plates melting at 154–155° C. The pure product was very water-soluble, recrystallizable from absolute alcohol, and decreasingly soluble in less polar solvents.

EXAMPLE XLII

Aqueous solutions of the product of Example XLI yielded a water-insoluble picrate consisting of rectangular yellow plates melting at 132–133° C. when treated with aqueous picric acid.

EXAMPLE XLIII

Aqueous solutions of the product of Example XLI also formed an immediate, heat sensitive flocculent white solid with sodium tannate which, after separation, was found to decompose at 188–191° C.

EXAMPLE XLIV

A product known commercially as "Cocomorpholine" is made by the reaction of dichloroethylether and cocoamine. The cocoamine is a mixture, 95% of which is 8% octylamine, 9% decylamine, 47% dodecylamine, 18% tetradecylamine, 8% hexadecylamine, 5% octadecylamine, and 5% octadecenylamine. 20 ml. of this material were dissolved in 50 ml. of xylene and treated with the chloramine-ammonia gas stream from the generator for 72 minutes. The temperature rose to 48° C. during the reaction. A gelatinous white solid formed and the reaction mixture became white viscous. Filtration gave 17 g. of crude 4-amino-4-cocomorpholinium chloride having the formula:

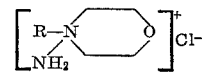

wherein R varies from $C_8H_{17}$ to $C_{18}H_{37}$ but is mostly $C_{12}H_{25}$. Trituration with acetone and subsequent extraction with 2-propanol gave an off-white solid consisting of small stubby needles. With a continuous application of heat, the needles became transparent at 100–101° C. and melted clear at 141–144° C. The novel 4-amino-4-"coco"morpholinium chloride forms soapy solutions when added to water. It was appreciably soluble in alcohol, somewhat less soluble in 2-propanol, and decreasingly soluble in acetone, xylene, and trichlorethylene. It formed a picrate, melting at 92–94° C.

EXAMPLE XLV

The product of Example XLIV was treated in aqueous solution with potassium hexafluorophosphate to yield a waxy product, melting point, 137–141° C.

EXAMPLE XLVI

The procedure of Example XLIV was substantially repeated, using a 10% chloroform solution of a mixture of alkylmorpholines available commercially as "Tallowmorpholine." This brown liquid is described by its manufacturer as being 95%

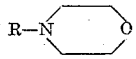

wherein R is a mixture including $C_{14}H_{29}$, $C_{16}H_{33}$, $C_{18}H_{35}$, and $C_{18}H_{37}$ in roughly a ratio of 1:12:23:14 parts. During the reaction, a considerable portion of the solution was lost through foaming. The gray semi-solid which was thus formed, was separated from the chloroform solution and washed with considerable solvent. It consisted chiefly of ammonium chloride. Evaporation of the filtrate gave a brown wax, crude 4-amino-4-tallowmorpholinium chloride, which softened and melted above about 43° C. with the application of heat.

EXAMPLE XLVII

The procedure of Example XLVI was substantially repeated, using excess tallowmorpholine as its own reaction medium. A mildly exothermic reaction ensued during which both foam and a semi-solid precipitate formed. Filtration of the off-white slimy precipitate, followed by copious washing with hexane, gave as a product, aminotallowmorpholinium chloride, contaminated with ammonium chloride. It was purified by extraction with acetone, and subsequent extraction of the acetone-soluble tan wax with 2-propanol. The propanol-soluble wax thus obtained readily formed soapy aqueous solutions. The novel product was soluble in alcohol, acetone, and chloroform, and somewhat less soluble in other organic solvents. On the melting block, it became transparent at 48–51° C. and melted at 110° C. with gas evolution.

EXAMPLE XLVIII

The product of Example XLVII was treated in an aqueous solution with potassium hexafluorophosphate to give a novel salt melting at 63–66° C.

EXAMPLE XLIX

The procedure of Example XLV was substantially repeated using n-heptane as solvent. 150 ml. of tallowmorpholine was dissolved in 1 liter of n-heptane and subjected for 2½ hours to a chloramine flow of 0.006 mol per minute. After all of the chloramine was consumed, 100 ml. of 2-propanol was added to coagulate the ammonium chloride. The reaction mixture was filtered and the filtrate was combined with 100 ml. of heptane to wash the ammonium chloride. The residue obtained on stripping solvent from the filtrate was a mixture of product, unreacted amine, ammonium chloride, small quantities of dark, presumably oxidized material. This residue was shaken up with an equal volume of 20% potassium carbonate three times, separated, and then recrystallized several times from ethyl acetate. The off-white and waxy solid thus obtained contained less than 1% free amine (by titration to Bromphenol Blue end point with HCl in isopropyl alcohol), ammonium chloride or amine hydrochloride (by titration with NaOH in isopropyl alcohol to phenolphthalein end point); it contained 8.98% Cl by $AgNO_3$ titration, suggesting a molecular weight of approximately 400 for the product. The water-soluble, somewhat hygroscopic product darkened on standing, presumably because of the olefinic groups. The reaction mechanism is shown below in Equation 10.

(10)
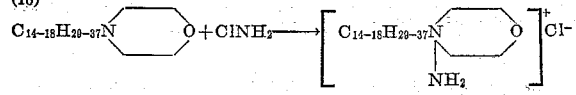

EXAMPLE L

To 30 ml. of xylene solution, containing 0.5 g. of chloramine, was added 1.5 g. N-3-aminopropylmorpholine at room temperature. The clear mixture was allowed to stand overnight, during which time a thick red oil, containing some solid, formed. The oil, crude 4-amino-4-(3-aminopropyl)-morpholinium chloride which was isolated by decantation, weighed slightly more than 1 g. This novel product was purified by dissolving it in a limited quantity of 2-propanol (which freed it from ammonium chloride) and pouring it into 3 volumes of ether. The thick brown oil thus obtained as precipitate could not be transformed into a solid by chilling, vacuum drying, or trituration. The purified product was readily soluble in water, and markedly soluble in 2-propanol, but decreasingly soluble in acetone and ether. It forms a diliturate (5-nitrobarbiturate) melting at 300° C., and a tannate that evolves gas at 205° C.

EXAMPLE LI

Morpholinomethyl-m-cresol was prepared by a method described in literature. See JACS 63, 270 (1941). This crude oily compound was dissolved in 3 volumes of chloroform, washed with two successive volumes of cold water to remove the more soluble bis and tris condensates and dried over anhydrous magnesium sulfate. The dried, clear chloroform solution was then saturated with the previously described chloroamine-ammonia gas stream for 48 minutes. During this time the temperature of the reaction mixture dropped slightly and a white solid formed. Approximately 30 minutes after gassing is stopped, effervescence within the flask ceased. The reaction mixture consisted of red solvent, red oil of less density, and light solid. Filtration gave 6.7 g. of washed, dried, crude 4-amino-4-(cresyl-methyl)morpholinium chloride. This novel product charred and decomposed at 190–210° C. Recrystallization from 2-propanol gave transparent prisms which melted with darkening and gas evolution at 158°–160° C.

EXAMPLE LII 4-phenylmorpholine, 25 g., was dissolved in 100 ml. of chloroform and subjected to a chloramine-ammonia gas stream for 48 minutes. An exothermic reaction ensued (although vaporization of chloroform caused the temperature of the solution to drop slightly) and a white precipitate was formed almost immediately. Once the gas stream was cut off, the temperature of the reaction mixture increased suddenly to 45° C., and remained at that point for almost an hour. After it had cooled to room temperature, the flask contained a cluster of fine crystals and a very dark liquid. The filtration and drying gave a crude 4-amino-4-phenylmorpholinium chloride, melting at 197–201° C. Analysis showed this novel product to be formed in approximately 50% yield. As isolated, it contained about one third ammonium chloride by weight. Subsequent purification via 2-propanol produced fine, stubby needles, melting at 202–204° C. This novel product was readily soluble in water, moderately soluble in hot 2-propanol and insoluble in nonpolar solvents.

EXAMPLE LIII

A chloramine ammonia gas stream from the generator was bubbled in 15 g. of 1-alkyl-2-heptadecenyl-2-imidazoline (known commercially as Amine O) in 300 ml. of trichloroethylene for one hour. Some heat evolved and a white precipitate appeared during the reaction. The precipitate was separated from the trichloroethylene solution by filtration. Washing and drying of this substance gave 5.8 g. of solid which was by chloride titration, approximately 8% of product and 92% $NH_4Cl$. Extraction of the solid from hot 2-propanol gave, on evaporation of the filtrate, approximately 0.5 g. of tan wax, crude 1-amino-2-heptadecenyl-1-(alkyl)imidazolinium chloride. Evaporation of the original trichloroethylene solution gave almost 17 g. of a red paste. The paste was triturated first with hexane, then repeatedly with dry acetone. The ultimate result of this treatment was an air-dried tan waxy imidazolinium chloride darkening at 140° C. and melting at 185–190° C. It was readily soluble in cold water. It was soluble in alcohol, but exhibited a lesser degree of solubility in organic solvents other than the parent amine.

EXAMPLE LIV

A solution of 21 g. of 1-(β-aminoethyl aminoethyl)-2-alkyl-2-imidazoline (sold commercially as Wax Amine A) in 100 ml. xylene was treated with the chloramine-ammonia gas stream. A strongly exothermic reaction ensued. Heat was evolved to such an extent that a water bath was required to keep the reaction temperature below 60° C. A mixture of crystalline waxy precipitates formed which tended to plug the gas inlet tube. Plugging eventually compelled the shortening of the reaction time to 41 minutes. Filtration, washing and drying gave 23 g. of tan solid, partially wax and partially brittle crystals, which melted in part at 78–82° C., and in part charred without melting at 230° C. On the basis of the parent amine recovered from the filtrate, conversion was 87% of theory. The product is 1-amino-1-(β-aminoethyl aminoethyl) - 2 - alkyl-2-imidazolinium chloride, where alkyl indicates a mixture of 40–80 carbon atom chains, with $C_{50}H_{101}$ being about average. After being twice recrystallized from 2-propanol, it consisted of light tan amorphous plates, melting at 88–89° C. The plates were soluble or dispersible (depending on the quantity) in water and insoluble in hexane.

EXAMPLE LV

The product of Example LIV was treated in aqueous acetone solution with potassium hexafluorophosphate. From this mixture was obtained a white insoluble hydrazinium hexafluorophosphate with a melting point of 63–67° C.

EXAMPLE LVI

A solution of 23 g. of 1-β-aminoethyl-2-alkyl-2-imidazoline in 100 ml. of xylene (the imadazoline being available commercially as Wax Amine B) was treated with chloramine by the procedure described in Example LIV for 72 minutes, with similar results. Filtration gave 25.9 g. of a brown wax, which by analysis was shown to represent a 55.4% yield of product admixed with about an equal weight of ammonium chloride. The crude mixture showed partial melting at 84–86° C. with charring at 210° C. Recrystallization from absolute alcohol gave amorphous tan plates, melting point 85–86° C., of 1-amino-1-(β-aminoethyl) - 2 - alkyl-2-imidazolinium chloride.

EXAMPLE LVII

Addition of 0.3 g. of chloramine dissolved in 30 ml. of xylene to 10 ml. of a 5% alkylated imidazoline (known commercially as Amine C) solution in xylene, gave after several hours approximately 0.5 g. of an amorphous white solid which melted over a crude range beginning at 170° C. The product was a mixture of homologs, the major constituent of which was identified as the novel 1-alkyl-2-undecyl-1-amino-2-imidazolinium chloride. This compound was distinctly water-soluble with foaming. Purification using 2-propanol gave a 53% yield as a white solid which had a melting point of 126–131° C.

EXAMPLE LVIII

The procedure of Example LVII was repeated using a similar cation active heterocycle known commercially as Amine S. A similar crude product was obtained, one important constituent of which was the 2-heptadecyl homolog. Recrystallization from 2-propanol gave off-white microcrystals melting at 86–89° C. The recrystallized product was clearly soluble in hot water, slowly soluble in cold water with foaming, soluble in alcohol and insoluble in carbon tetrachloride and hexane.

EXAMPLE LIX

The product of Example LVIII was treated with potassium hexafluorophosphate to give a water-soluble hydrazinium hexafluorophosphate melting at 158–162° C. with decomposition.

EXAMPLE LX

The procedure of Example LVI was substantially repeated using 17.7 g. of 1-hydroxyethylamino-2-heptadecenyl-2-imidazoline (available commercially as Amine 220). During a mildly exothermic but slow reaction an initial precipitate formed, consisting of 8.6 g. of off-white solid, very largely ammonium chloride. Extraction of this solid with 2-propanol gave a modicum of crude 1-amino-1-β - hydroxyethyl-2-heptadecenyl-2-imidazolinium chloride. This compound appeared as off-white, waxy cubes, which, with the application of heat, exhibited inchoate sublimation at 63° C., but did not melt until the temperature was raised to above 200° C.

EXAMPLE LXI

A mixture of hydroxyethylated diamines of the general formula:

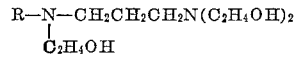

is available commercially as Ethoduomeen T–13. This mixture is prepared by reacting tallowamine with acrylonitrile, reducing the nitrile to $CH_2NH_2$, and reacting with approximately 3 mols of ethylene oxide according to Equation 11.

(11)
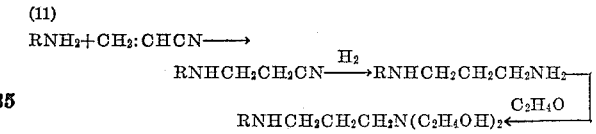

R in the above equation is derived from tallow fatty acids and is hydrogenated during the reduction of the nitrile. It is largely a mixture of hexadecyl and octadecyl in a ratio of approximately 1:3. The manufacturer of Ethoduomeen T–13 states that his product, as sold, contains approximately 85% of the tetrasubstituted propylenediamine, having an average molecular weight of 558 (by neutralization).

Ethoduomeen T–13, 100 g. in 1000 ml. n-heptane was treated for 45 minutes with a chloramine-ammonia gas stream from the generator at an average flow rate of 0.00607 mole per minute. After the reaction was completed, the product was separated from the above mixture by filtration. A wet filter cake weighing 230 g. was thereby obtained. The wet mass was purified by dissolving in butanol, filtering and salting out with 8 times its volume of acetone; filtering and repeating twice more with decreasing dimethylketone-butanol ratios. The final product, obtained after being vacuum dried at 104° F., was a firm cohesive amber gel, 95% pure 1,1-bis(2-hydroxyethyl) - 1 - [3-(N-tallow-N-β-hydroxyethyl)aminopropyl-1-] hydrazinium chloride. The preparative reaction is shown below in Equation 12.

(12)
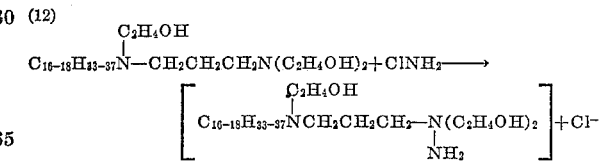

It is entirely possible that the novel product has the obvious alternate structure:

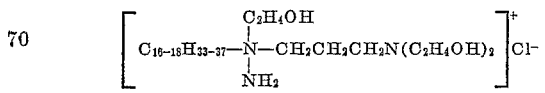

Our experiments and the information obtained from the manufacturer of Ethoduomeen suggest that steric factors makes this unlikely. I cannot, however, rule out the possibility of the alternate structure at the present time. The product is highly water-soluble; its aqueous solutions are soapy.

EXAMPLE LXII

The procedure of Example LXI was substantially repeated using 19 g. Ethoduomeen T/13 in 200 ml. of trichloroethylene. This reaction was characterized by rapid evolution of heat, formation of considerable foam and the precipitation of a white solid. Filtration of this quasi-colloidal solid yielded a white paste which was washed with isopropyl alcohol on the filter paper until it turned waxy. The white solid product, melting at 237–254° C., represented an impure mixture of the desired hydrazinium chloride contaminated to a considerable extent with $NH_4Cl$. The isopropyl alcohol wash, and a hot isopropyl extract of the evaporated filtrate were combined and evaporated to yield a total of 19 g. of product, 3 - (N - tallow - N - β-hydroxyethyl)aminopropyl - 1 - hydrazinium chloride, having the structural possibilities indicated above in Example LXI. It formed a hexafluorophosphate that melted at about 194° C., and a mercuri-iodide that decomposed at about 175° C.

EXAMPLE LXIII

A chloramine-ammonia gaseous mixture was bubbled into a trichloroethylene solution of tallow-bis-hydroxypolyethoxyethylamine, a product known commercially as Ethomeen T/25. The parent amine is represented by its manufacturer as having a structure:

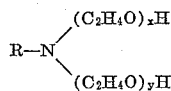

wherein $x+y$ equals 15. The compound has an average molecular weight of 937. R represents tallow, a mixture of fatty moieties thoroughly described in Example XLIX. A white precipitate formed in the reaction mixture as the reaction progressed. Extraction of this precipitate with ethanol, gave fine, transparent, off-white prisms of tallow-bis-hydroxypolyethoxyethylhydrazinium chloride, which melted at 198–201° C. and decomposed at 218–223° C.

EXAMPLE LXIV

A commercial product similar to that described in Example LXIII, marketed as Ethomeen 18/60, is described by its manufacturer having the structural formula:

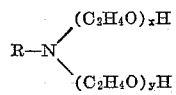

wherein $x+y$ equals 50, and R is derived from commercial stearic acid, largely $C_{18}H_{37}$ with about 6% $C_{16}H_{33}$ and about 1% $C_{18}H_{35}$. The average molecular weight of this compound is given as 2484. The chloramine-ammonia gas mixture was bubbled into a trichloroethylene solution of this base. The reaction resulted in the immediate formation of a precipitate which was primarily ammonium chloride. The solid was extracted with isopropyl alcohol, and this extract was combined with the reaction filtrate. Evaporation of this solution gave as a tan, waxy product, a hydrazinium chloride of the probable structure:

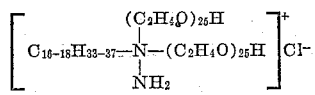

Physically, this product is hard wax with a greasy feel. It was readily soluble in water with considerable foaming. In addition, it was found to be soluble in most of the common solvents except paraffins. The wax was subjected to heat which caused it to soften and run at 180° C. and decompose above 208° C.

EXAMPLE LXV

The procedure of Example LXIV was substantially repeated using bis-(2-ethylhexyl)-ethanolamine as a reactant. The product obtained from this reaction mixture, bis - (2 - ethylhexyl)-hydroxyethyl-hydrazinium chloride having the structure:

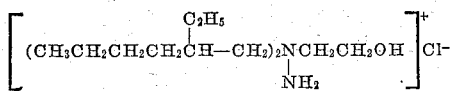

was a largely water-insoluble oil.

EXAMPLE LXVI

A product commercially available as M2S, referred to as bis-soyamethylamine, is a brown inhomogeneous oil which melts turbid at 8–10° C., clear at 60–65° C. and boils at 230–310° C. at 0.2 mm. It is made from soybean fatty acids and contains approximately 88% tertiary amine, about 90% of which is a mixture of dihexadecylmethyl, dioctadecylmethyl, dioctadecenylmethyl, and dioctadecadienylmethylamines in a 20:17:26:37 ratio. The product as sold has an experimentally determined molecular weight of 594. The mixture of hydrazinium chlorides formed by chloramination in xylene is solvent soluble, and can be fractionated into a less stable, less saturated, more solvent-soluble fraction which is oily and a more markedly saturated, less soluble fraction which appears as a soft pearly wax that melts clear at 158–160° C. with preliminary softening at 88° C. This product has the approximate structural formula:

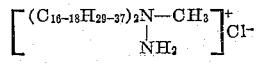

EXAMPLE LXVII

A tared open flask containing 0.5 mole (142.2 g.) stearic acid was heated to 70° until the acid became almost completely molten. To this mixture was cautiously added 0.52 mole (52 g.) dimethylaminopropylamine to form, with evolution of heat, aminopropyldimethylaminium stearate.

The temperature of the reaction mixture was raised to 150° C. over a period of 3½ hours, by which time the flask had lost 8.5 g. of weight. After an additional three hours at 150° C., the flask had lost 12 g. in weight, slightly more than the theoretical amount, according to Equation 13:

(13)
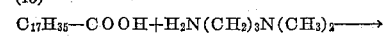
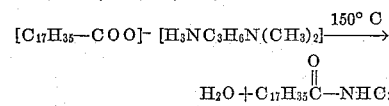

The cooled reaction mixture was broken up and washed with water to remove unreacted amine, then vacuum distilled. A forerun, weighing 33–36 g., was collected up to 208° C. at 2 mm.; then a major fraction of 123.9 g. at 209–225° C. at 2 mm. was separated from the 27 g. of residue. The major fraction, 3-stearoylaminopropyldimethylamine, M.P. 49–50° C., is an off-white wax which is water-insoluble and soluble in ethyl alcohol and hot dilute HCl. The product, on titration with 0.2071 normal HCl and isopropyl alcohol, gave a satisfactory equivalent weight. Calculated: 368, obtained: 370.

EXAMPLE LXVIII 50 g. of the product of Example LXVII were treated in 1000 ml. of chloroform with 2.5 equivalents of chloramine from the generator. From this reaction mixture was obtained 42.9 g. of product, appearing as a tough yellow wax, softening at 45° C. and decomposing at about 130° C. The product, 1,1-dimethyl-1-(stearoylamidopropyl)hydrazinium chloride has the structural formula:

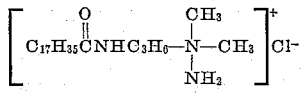

It was recrystallizable from water as nacreous plates.

EXAMPLE LXIX 100 g. of lauric acid were heated for three hours and 50 minutes at 147–153° C. with 51 g. of dimethylaminopropylamine. The resulting product was vacuum distilled to give 110.5 g. of distillate between 171–194° C. at 2 mm., mostly in the range 195–194° C. The lauroylaminopropyldimethylamine thus obtained was similar in its properties to the product of Example LXVII. Titration to a Brom Phenol Blue end point with 0.2071 normal HCl in isopropyl alcohol indicated that the product amine had a molecular weight of 287. The calculated value for this amine is 284.

EXAMPLE LXX 50 g. of the distilled aminoamide of Example LXIX were dissolved in 1000 ml. of chloroform. This solution was treated with 2.5 equivalents of chloramine from the generator, yielding only ammonium chloride as the precipitate. Evaporation of the solvent and trituration of the residue with diethylether gave 48 g. of a partially crystalline cohesive white wax, becoming soft and transparent at 53° C. but not decomposing at 210° C. Trituration with acetone gave a cleaner looking product which, on being vacuum dried, was found by analysis to be 98% pure 1,1-dimethyl-1-[3-(lauroylaminopropyl)]hydrazinium chloride. Recrystallization from water gave pearly plates softening and going transparent under pressure at about 72° C.

EXAMPLE LXXI 50 g. of oleic acid, 34 g. of 4-(3-aminopropyl)-morpholine and 0.5 g. hydroquinone (anti-oxidant) was kept at 146±2° internal temperature for 3½ hours. Fractional distillation yielded 78.5 g. of product which boiled at 218–268° C. under 2 mm.; chiefly in the range of 260–268° C. The product amine crystallized to a considerable extent on standing. Titration with 0.2071 normal HCl showed that it contained about 10% lower fatty acid amides. It was, however, at least 85% N(oleoylaminopropyl)morpholine.

EXAMPLE LXXII

The product of Example LXXI was treated in chloroform solution with a chloramine-ammonia gas stream by a method similar to that described in Example LXX. The resulting product was 40 g. of a whitish wax, 4-amino-4-[3(oleoylamino)propyl]morpholinium chloride, somewhat less resistant to oxidation than the products of Examples LXVIII and LXX. It was recrystallizable from water as flat plates which slowly yellowed.

EXAMPLE LXXIII

The chloramine-ammonia gas stream from the generator was bubbled into 20 ml. of methyldiethanolamine in 50 ml. of xylene for 77 minutes. The reaction was strongly exothermic. Although the mixture was cooled in a water bath, its temperature remained at 40–43° C. during the gassing operation. It was allowed to stand overnight without further treatment, during which time the chloramine was completely consumed. A clear layer of xylene was decanted from the opaque oily product. The product was subsequently washed by decantation with 3 successive 25 ml. portions of xylene. The tan oily liquid, crude 1-methyl-1,1-bis(2-hydroxyethyl)hydrazinium chloride could not be obtained in solid form by freezing, trituration with solvents such as hexane, ether and dioxane, or precipitation from solvents. After purification of the product by charcoaling in alcohol solution, evaporating the solvent and vacuum drying over $P_2O_5$, a viscous brown oil was obtained. This oil was soluble in water and alcohol, and to a limited extent in acetone; it was insoluble in less polar solvents. Benzoylation converted it to the bis-benzoate, melting at 163–165° C.

EXAMPLE LXXIV

The procedure described in Example LXXIII was substantially repeated using ethyldiethanolamine as a reactant. The results in all aspects were strikingly similar. The product thus obtained, in slightly reduced yield, was a brown oil possessing comparable physical properties. It was soluble in water, alcohol and acetone; insoluble in ether, hexane and xylene. Its bis-benzoate decomposed at 191.5–193° C.

EXAMPLE LXXV

The chloramine-ammonia gas stream was passed into 20.3 g. of phenyldiethanolamine in 50 ml. of dimethylformamide for 55 minutes. The reaction temperature was maintained at 40–42° C. using a cold water bath. The reaction mixture was allowed to stand without further treatment overnight. Subsequent filtration gave 11.2 g. (air-dried) of pale blue crude 1-phenyl-1,1-bis-(2-hydroxyethyl)hydrazinium chloride. The product sublimed at 206–210° C. Evaporation of the filtrate after work-up gave an additional 4.1 g. of crude hydrazinium chloride. After purification by recrystallization from 2-propanol, the sublimation point of the novel pale blue crystals remained unchanged. The product was soluble in water and alcohol; insoluble in hydrocarbons, ethers and halohydrocarbons. It formed a salt with dilituric acid which melted above 250° C., subliming from about 230° C. on.

EXAMPLE LXXVI

A solution of 20 g. of 2,2'-(p-hydroxy phenylamino)diethanol (sometimes also referred to as p-hydroxyphenyldiethanolamine) in equal volumes of dioxane and dimethylformamide was treated with an excess of ammonia to convert it to the solvent-soluble ammonium salt. The solution was then subjected to the chloramine treatment described in the previous examples. The temperature of the red-brown solution rose to 50° C. in about 10 minutes. A cold water bath was used to control the reaction temperature at 35° C. The color of the solution faded and a crystalline solid formed. Shortly after gasification had been discontinued (chloramine treatment lasted 40 minutes), the reddish supernatant lost its power to oxidize acidified potassium iodide solution; in other words, it no longer contained chloramine. It was filtered and the yellowish solid, crude 1,1-bis-2-hydroxyethyl-1-β-hydroxyphenyl hydrazinium chloride:

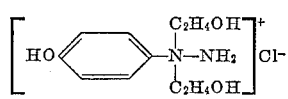

was obtained as a product. It was washed with two 30 ml. portions of dioxane, then with two 30 ml. portions of hexane. The washed product was air-dried overnight, then vacuum dried for two hours, yielding 10 g. of a mixture (roughly 5 parts product to one part ammonium chloride) most of which melted below 150° C. Recrystallization converted this product to an off-white, sandy solid, melting point 156–157° C.

EXAMPLE LXXVII

A solution of 0.01 mol chloramine (0.51 g.) in 50 ml. of xylene was treated with 5 ml. of α-methylbenzyldiethanolamine at 10–15° C., and allowed to sit overnight. The xylene was then decanted. The sticky, insoluble product was dissolved in acetone, filtered free of ammonium chloride and evaporated to dryness. The viscous oil left after evaporation was washed well with anhydrous ether, which converted it to gleaming prisms of 1,1-bis-(2-hydroxyethyl)-1-(1-phenylethyl)hydrazinium chloride, melting point 100–105° C. The crude product on recrystallization melted at 108–110° C. It was very soluble in water, soluble in alcohol and somewhat less so in acetone, but insoluble in the less polar organic solvents.

EXAMPLE LXXVIII

A solution of 20 ml. (21.8 g.) of commercial triethanolamine in 50 ml. of xylene was subjected to a chloramine-ammonia nitrogen gas stream for 68 minutes. Use of a cold water bath was necessary to hold the reaction temperature below 45° C. Chloramine uptake was rapid and approximately 90% complete; all the chloramine of the reaction flask had been consumed within five minutes after the gas flow was stopped. The white oil that precipitated during the reaction was separated by decantation, washed with hexane and carbon tetrachloride then dried in a vacuum desiccator. Heating with limited quantities of 2-propanol gradually converted this product mass to a solid, crystalline 1,1,1-tris-(2-hydroxyethyl)hydrazinium chloride, melting point 178–180° C. It was very soluble in water and ethanol, appreciably soluble in 2-propanol, and insoluble in hydrocarbons.

EXAMPLE LXXIX

Diethanolamine, warmed with an aqueous mixture containing one equivalent of hydroxymethyldibutylamine, gave a fair yield of N,N-dibutyl-N',N'-bis-(hydroxyethyl)diethanolamine according to the preparative reaction shown in Equation 14.

(14) $(C_4H_9)_2NCH_2OH + HN(C_2H_4OH)_2 \rightarrow (C_4H_9)_2NCH_2N(C_2H_4OH)_2$ The slightly yellow, aqueous solution was saturated with anhydrous potassium carbonate giving an upper layer of a viscous, light yellow oil. The crude diamine was dissolved in ether, dried over anhydrous potassium carbonate and then treated with a solution of chloramine (2 equivalents or 0.12 g. by active chlorine determination). The mixture was kept in a cold water bath overnight, by which time an oil, containing some solid, had settled out. The solvent was decanted off and the heavy yellowish oil was dissolved in excess acetone. The solution was then filtered free of solid. The acetone solution, on evaporation in absence of excess moisture, gave a brownish yellow oil, crude 1,1-bis-(2-hydroxyethyl)-1-(di-n-butylamino)methylhydrazinium chloride. The product was very soluble in and readily decomposed by water; it was soluble in alcohol, less so in acetone and insoluble in ether and hydrocarbons.

EXAMPLE LXXX

A gaseous chloramine mixture was passed into excess N,N-dimethylaminoethanol at 25° C. No solid was formed during the reaction, but upon chilling the reaction mixture the hydrazinium chloride precipitated as a crystalline mass. The material was recrystallized from an ethanol-ethyl acetate mixture and it was subsequently identified as 1,1,1-(2-hydroxyethyl)-dimethylhydrazinium chloride, melting point 160–163° C. It formed a picrate melting at 170° C.

EXAMPLE LXXXI

The chloramine-ammonia gas stream was passed into excess liquid N,N-diethylaminoethanol. As the reaction proceeded, a paste-like mas formed which was separated from the unreacted amine by decantation. This paste-like product was mixed with ethyl ether which resulted in crystallization of a solid and the evolution of ammonia. Because of the hygroscopic nature of the product, 1,1,1-(2-hydroxyethyl)diethylhydrazinium chloride, it was converted to the picrate (melting point 179.5–180.5° C.) for identification. Approximately a 99% yield of product was obtained based upon the amount of chloramine used.

EXAMPLE LXXXII

The chloramine-ammonia gas stream prepared as described in the foregoing examples was bubbled into excess liquid N,N-diethyl-N'-benzylidene-ethylenediamine at 25° C. A strongly exothermic reaction occurred and a semi-solid precipitated from the reaction mixture. After separation by conventional laboratory techniques the product was identified as 1,1-diethyl-1-(2-benzylideneaminoethyl)-hydrazinium chloride. A portion of this hydrazinium chloride was treated with water. It readily hydrolyzed to form an oil, the novel 1,1-diethyl-1-(2-aminoethyl)hydrazinium chloride. This compound was separated from the reaction mixture and identified by laboratory analyses similar to those described in the other examples.

EXAMPLE LXXXIII

A solution was prepared consisting of 25 ml. of 41% solution of triethanolaminetitanate:

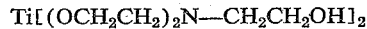

in isopropyl alcohol and 25 ml. of dimethylformamide. A chloramine-ammonia gas stream was passed into this mixture at 20–30° C., resulting in a strongly exothermic reaction. After all the chloramine had been used up, the mixture was stirred into an excess of benzene. The chloramine adduct separated in the form of an extremely viscous paste. By laboratory analysis it was identified as the novel 1,1'-bis-(2-hydroxyethyl)-1,1,1',1'-bis-[spirotitan-bis-(2-oxyethyl)] dihydrazinium dichloride.

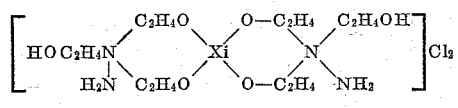

EXAMPLE LXXXIV

Liquid diethylcyanamide, $(C_2H_5)_2NCN$, in excess, was reacted with chloramine in the absence of solvent at 20° C. The reaction mixture was filtered free of precipitated ammonium chloride and on standing the filtrate yielded long needles of the adduct, which decomposed at about 140° C. By laboratory analysis, the novel product was identified as 1-cyano-1,1-diethylhydrazinium chloride, formed according to the reaction shown below in Equation 15.

(15) 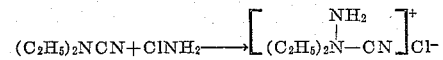

EXAMPLE LXXXV

An excess of solvent-free 3-diethylaminopropanol was treated with a chloramine-ammonia gas stream at 25° C. From this mixture was obtained the novel hydrazinium salt, diethyl-(3-hydroxypropyl)hydrazinium chloride, melting point 115–116° C.

EXAMPLE LXXXVI

An excess of solvent-free dimethylaminoproprionitrile was treated with a chloramine-ammonia gas stream. The product obtained from the reaction mixture was the novel dimethyl-(2-cyanoethyl)hydrazinium chloride, a highly hygroscopic solid, melting at 98–101° C. Its hexafluorophosphate was an oil.

EXAMPLE LXXXVII

Dimethylaminopropylamine was dissolved in twenty times its weight xylene and thereafter treated with the chloramine-ammonia gas stream from the generator. The product obtained quantitatively from this mixture was the highly hygroscopic dimethyl-(3-aminopropyl) hydrazinium chloride.

EXAMPLE LXXXVIII

An excess of solvent-free diethylaminopropylamine was treated in the usual manner with the chloramine-ammonia gas stream. The novel product resulting therefrom was diethyl-(3-aminopropyl)hydrazinium chloride.

EXAMPLE LXXXIX 20.2 g. of aminopyrine, suspended in 100 ml. of xylene, were treated over a period of 85 minutes with 2.1 equivalents of chloramine from the generator. 6.5 g. of 1,1-dimethyl-1-antipyrylhydrazinium chloride

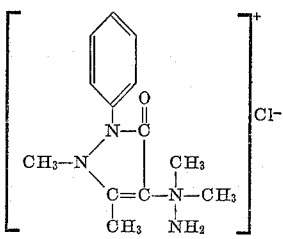

was obtained therefrom. This crude product, 86% pure, melted with decomposition at 144–147° C. Additional product equivalent to a total yield of 34% of theory was recovered from the filtrate.

EXAMPLE XC 50 g. of procaine hydrochloride diethylaminoethyl 4-aminobenzoate hydrochloride, dissolved in 350 ml. of water was layered over with 200 ml. of chloroform and then treated with a three-fold excess of sodium bicarbonate to form the free amine according to the preparative reaction shown below in Equation 16.

(16)

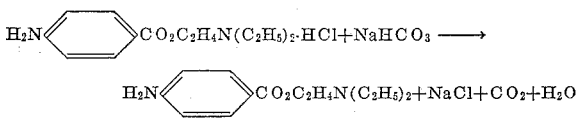

The combined chloroform extract and 50 ml. of wash, dried for one-half hour over anhydrous $MgSO_4$, was made up to 1 liter with chloroform, then subjected to three-quarters of an equivalent of chloramine from the generator. The reaction was completed within 30 minutes after gasification stopped. A precipitate weighing 25.6 g. containing 63.7% pure 1,1-diethyl-1-[2-(4-aminobenzoyloxy)ethyl] hydrazinium chloride was obtained therefrom. After one ethanol extraction, a product was obtained which melted between 208–210° C. Additional product was obtained from the chloroform filtrate.

EXAMPLE XCI

An aqueous solution of the product of Example XC was treated with aqueous potassium hexafluorophosphate to form the corresponding hydrazinium salt melting at 152° C.

EXAMPLE XCII

A chloramine-ammonia gas stream was passed into a solution of 50 ml. of 4-t-octylphenoxyethoxyethyldimethylamine in 50 ml. of mixed xylenes for almost 88 minutes. The ensuing exothermic reaction caused the temperature to rise from 28° C. to 57° C., and remain there during the run. Because of the marked increase in viscosity of the clear mixture as the reaction progressed, it was necessary to add 50 ml. more xylene 30 minutes after starting, and an additional 30 ml. half an hour later. Shortly after this second xylene addition, the reaction mixture slowly turned milky and started to foam. Chloramine absorption was almost quantitative and its conversion was rapid. Within 30 minutes after gasification had been stopped, all of the chloramine had reacted. The mixture was allowed to sit overnight, during which time it formed a somewhat viscous uniform dispersion of two liquids and a solid. Since this was not amenable to separation by common procedures, it was evaporated to a thick white cream. This was washed with a limited quantity of cold xylene to remove unconverted amine, and then extracted with absolute alcohol. Evaporation of the ammonium chloride free solution gave a soft white paste, which was purified by extraction with anhydrous acetone and subsequent evaporation of the solution thus formed. The soft, light tan paste so obtained could not be solidified by trituration with solvents, or evaporated in vacuo over $P_2O_5$. However, on being seeded with the white solid obtained as described hereafter in Example C, the paste was converted to a soft light tan wax, melting point 92–95° C. The product was almost chemically pure 1,1-dimethyl-1-[2-(4-t-octylphenoxyethoxy)ethyl] hydrazinium chloride. It appeared as a soft, microcrystalline wax with rather an oily feel. It was readily soluble in water, alcohol, acetone, chloroform; less so in ether, xylene, and the paraffinic hydrocarbons.

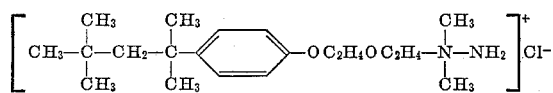

EXAMPLE XCIII 5 g. of the amine used in Example XCII was suspended in 95 ml. of 5% ammonium hydroxide at 10–15° C. by the addition of a dispersing agent of an alkyl naphthalene sulfonic acid type (Tamol NNO) and good agitation. To this was added dropwise, over three hours, a chilled solution of 0.5 g. of chloramine and 100 ml. of water, prepared according to the directions given in Inorganic Syntheses. The mixture was stirred at 10–15° C. for an additional hour, then at room temperature for the remainder of two days. Although most of the active chloride had disappeared within 24 hours and all within 48, the mixture still contained some unreacted amine. The mixture was charcoaled and evaporated to dryness in an air stream. The solid residue was washed with cold hexane, then extracted with chloroform. Evaporation of this tan extract gave less than 30% yield of crude 1,1-dimethyl-1-2-(4-t-octylphenoxyethoxy)ethyl hydrazinium chloride.

EXAMPLE XCIV

The procedure of Example XCII was substantially repeated using 0.281 mol (100 g.) of commercial 4-t-octylphenoxyethoxyethylenediamine in 1000 ml. of n-heptane and 0.404 mol of chloramine from an essentially nitrogen free gas stream. During the reaction, over 87% of the product precipitated out as a white, waxy solid. Conversion figures for both the amine and chloramine were very good. After two recrystallizations from n-heptane, the product, 1,1-dimethyl-1-[2-(4-t-octylphenoxyethoxy)ethyl] hydrazinium chloride was obtained as a gleaming white wax, melting point 102–103° C., 99% pure by chloride titration.

EXAMPLE XCV

A mixture of (3-methyl-4-t-octylphenoxy)ethoxyethanol, 5 g. in 25 ml. thionyl chloride gave, on refluxing 45 minutes, a corresponding chloride. This, on degassing at 50° C. in a stream of nitrogen, was isolated as a reddish oil, crude octylcresoxyethoxyethyl chloride. The crude oil in 20 ml. (washed and dried) carbon tetrachloride, was mixed with a similar portion of benzylmethylamine, 2.2 equivalents, allowed to stand for 6 days, and then subsequently refluxed for 2 hours. The cooled solution, after being filtered, washed and dried, was freed of solvent, and then vacuum distilled to give 2.1 g. of yellowish benzylmethyl-(3-methyl-4-t-octylphenoxy) ethoxyethylamine.

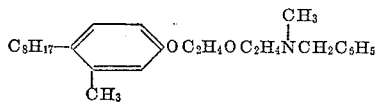

EXAMPLE XCVI

The tertiary amine of Example XCV in 50 ml. n-hexane as subjected to a chloramine gas stream for thirty minutes. The mixture of oil and solid which precipitated during the mildly exothermic reaction was shown to consist of the desired product, 1-benzyl-1-methyl-1[2-(3-methyl-4-t-octylphenoxy)ethoxyethyl]hydrazinium chloride and a larger quantity of ammonium chloride. Extraction with chloroform and subsequent evaporation gave an ammonium chloride free product as an oil which could not be converted into a solid by standard physical procedures or by the formation of derivatives.

EXAMPLE XCVII

A solution of 0.02 mol (4 g.) of 1-(2-chloroethoxy)2-phenoxyethane in 30 ml. dry benzene was treated with 0.04 mol (2.9 g.) pyrrolidine in 20 ml. of benzene. The mixture was allowed to stand for several days. Filtration gave a 72% yield of pyrrolidine hydrochloride. The filtrate was washed with water, then extracted with 250 ml. portions of 5% HCl. The combined acid extract, on being made alkaline, gave a 68% yield of crude N-[β-(2-phenoxyethoxy)ethyl]pyrrolidine. The amine, 1.1 g. in 20 ml. chloroform, was dried over anhydrous magnesium sulfate 30 minutes and then decanted.

EXAMPLE XCVIII

A clear, light brown decantate of Example XCVII was subjected to treatment with a total of 0.3 g. of chloramine from a chloramine-ammonia gas stream. The solid that precipitated was found to be a mixture of ammonium chloride and 1-amino-1-[2-(β-phenoxyethoxy)ethyl]pyrrolidinium chloride, in roughly a 5:1 proportion. The mixture was extracted with absolute ethanol and this extract, evaporated to dryness, gave tan crystals of the desired pyrrolidinium chloride, melting point 180–185° C. (d.). Evaporation of the reaction filtrate gave more crude product as an oil, which in addition contained unreacted amine. The overall yield from chloroethyl-ether through amine to hydrazinium chloride was slightly less than 30%.

EXAMPLE XCIX

In a larger scale experiment the procedures of Examples XCVII and XCVIII were repeated. The benzene solution was refluxed for three hours, cooled, filtered washed with water, dried over anhydrous magnesium sulfate and then treated directly with the chloramine-ammonia gas stream. The precipitate from the mildly exothermic reaction was an off-white, crystalline mixture of ammonium chloride and aminophenoxyethoxyethylpyrrolidinium chloride in approximately a 1:1.5 weight ratio. The product, purified by recrystallization from methanol-dioxane and ethanol-dioxane mixtures, melted with decomposition at 192–193° C. It was readily soluble in water, appreciably soluble in alcohol and relatively insoluble in acetone and ethers. The overall yield was 58% of the theoretical.

EXAMPLE C

From 3-bromopropoxybenzene and 2 equivalents of morpholine in dry benzene was obtained (by a procedure similar to those of the preceding examples) a 74% yield of 4-(3-phenoxypropyl-1)morpholine. Reaction of this product in dry chloroform with chloramine gave a 75% yield of 4-amino-4-(3-phenoxypropyl-1) morpholinium chloride (as a fluffy off-white solid containing a small amount of ammonium chloride). Extraction of the crude product (which melted over a range of 180–190° C.) with absolute alcohol and recrystallization from alcohol-dioxane mixture gave glistening, fine needles of 4-amino-4-(3 - phenoxypropyl - 1)morpholinium chloride, melting point 183–184° C., after undergoing a phase change and sintering at 120–121° C. The crystalline product was very soluble in water and markedly soluble in ethyl and isopropyl alcohols. It was relatively insoluble in ethers and hydrocarbons.

EXAMPLE CI

By a method described in the preceding examples 6-allyl-2-methoxy - 1 - (2 - diethylaminoethoxy)benzene was treated with a chloramine-ammonia gas stream to give a poor yield of 1,1-diethyl-1-[2-(6-allyl-2-methoxyphenoxy)ethyl]hydrazinium chloride, melting at 153–154.5° C. with decomposition.

EXAMPLE CII

A portion of N-(p-cresoxyethyl)piperidine was treated in solution with a chloramine-ammonia gas stream to give as a chloroform-soluble product an oil identified as 1-amino-1-[2-(p-cresoxy)ethyl]piperidinium chloride.

EXAMPLE CIII p-Nonylphenoxyethyldiethylamine in chloroform was treated with chloramine to give a thick yellow surface-active oil identified as 1,1-diethyl-1-[2-(p-nonylphenoxy)ethyl]hydrazinium chloride.

EXAMPLE CIV

The chloramine-ammonia gas stream was bubbled into 20 g. of commercial bis-(2-hydroxyethyl)dehydroabietylamine, in 70 ml. of xylene for 90 minutes. During gasification, the temperature rose spontaneously to 53° C., and remained there for most of the reaction period. Chloramine uptake was fairly rapid; approximately 90% of the stoichiometric quantity was converted in the reaction vessel. The white solid that formed was separated after the reaction mixture had been allowed to stand. Analysis showed that it was the impure product, 1,1-bis-(2-hydroxyethyl)-1-dehydroabietylhydrazinium chloride, dispersed in a greater weight of ammonium chloride. Evaporation of the clear, light brown filtrate gave 22 g. of a very thick brown oil, which contained the bulk of the desired product. A small portion of the crude oily product was purified by partitioning between carbon tetrachloride and water; evaporation of the charcoaled water layer gave a thick, light brown gum representing almost pure hydrazinium chloride. Repeated recrystallization of the reaction precipitate from 2-propanol gave pure 1,1-bis-(2-hydroxyethyl)-1-dehydroabietylhydrazinium chloride as off-white, wet waxy crystals that softened, then melted with decomposition at 201–206° C.

The parent amine, dehydroabietyldiethanolamine, is a thick light brown liquid, available commercially as Polyrad 0200. It is prepared by the reaction of limited amounts of ethylene oxide with the primary amine obtainable from dehydrogenated and aromatized resin and is therefore a complex mixture of both steroisomeric and homologous reaction products. The complexity and inhomogeneity of this commercial product is indicated by the manufacturer's data; its experimentally-determined neutralization equivalent is approximately 5% greater and its nitrogen content is approximately 5% less than calculated for a pure product of the linear formula $C_{24}H_{39}NO_2$. It is therefore not surprising that a completely crystalline, pure entity of sharp melting point cannot be obtained as reaction products.

EXAMPLE CV

Bis-(2 - hydroxypolyethoxyethyl)dehydroabietylamine, available commercially as Polyrad 0500 is described by its manufactureres as having the following average structural formula:

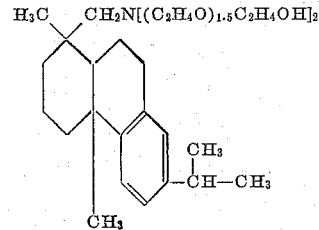

A 5 g. portion of this amine was dissolved in 100 ml. of dimethylformamide and subjected to the chloramine gas stream from the generator. A nearly quantitative absorption of chloramine occurred during the reaction. As the reaction progressed, a substantial quantity of ammonium chloride containing traces of the desired product precipitated from the reaction mixture. Evaporation of the clear, tan filtrate at room temperatures gave a mixture of viscous tan oil and brown paste. Selective extractions with hexane, then benzene, then limited amounts of carbon tetrachloride left as a residue a brown semi-solid, crude, 1,1-bis(hydroxysesquiethoxyethyl) - 1 - dehydroabietylhydrazinium chloride. By repeatedly charcoaling, clarifying and evaporating aqueous solutions of a portion of the gum, there was obtained finally as a soft light tan wax the desired hydrazinium chloride (95% pure by chloride titration). The product was clearly soluble in water, soluble in acetone and chloroform and decreasingly soluble in carbon tetrachloride, benzene and hexane.

EXAMPLE CVI

A 5 g. portion of Polyrad 0500, the amine of Example CV, was dissolved in 50 ml. of dioxane and treated with two equivalents of chloramine from the generator at 15–20° C. After the active chlorine had been consumed, the reaction mixture was filtered into two volumes of hexane. The combined solvents were decanted free of the lower more viscous layer that it formed; they contained no ionic chloride, therefore, no product. The viscous layer was washed thoroughly by decantation with hexane. It was then vacuum dried to give an 84% pure hydrazinium chloride, a very thick amber oil.

EXAMPLE CVII

Bis-(2-hydroxyenneaethoxyethyl)dehydroabietylamine, a product available commercially as Polyrad 2000 has the average structure shown hereinunder:

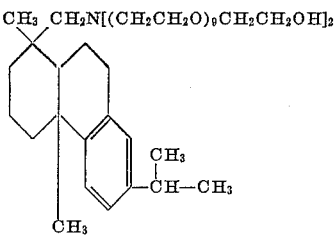

A portion of this amine was dissolved in dioxane, 5 g. in 50 ml., and treated with chloramine-ammonia gas stream. The product that precipitated during the reaction consisted of both solid ammonium chloride and oily, 1,1 - bis - (2-hydroxyenneaethoxyethyl)-1-dehydroabietylhydrazinium chloride. Addition of 3 volumes of hexane to the reaction mixture gave an oily product, which was freed from solvents by decantation and then from ammonium chloride by extraction with chloroform. The tan oil obtained on evaporation of the chloroform was soluble in water and insoluble in benzene.

EXAMPLE CVIII

The viscous tertiary dehydroabietylamine containing an average of eleven $C_2H_4O$ groups per molecule (available commercially as Polyrad 1100) was subjected, without solvent, to a chloramine gas stream. After 2 equivalents of chloramine had been consumed, and the gasification stopped, the reaction mixture consisted of a dispersion of white solid in apparently two liquid phases. Treatment of the mixture with an equal volume of butanol, decantation of the upper phase (butanol plus unreacted amine), extraction of the lower phase with chloroform and evaporation of the chloroform extract gave a viscous brown oil. It comprised almost all of the desired hydrazinium product. The yield by this procedure was not as good, nor the product as pure, as when a solvent was used.

EXAMPLE CIX 20 g. of Butter Yellow dissolved in 200 ml. of xylene were treated with 1.3 equivalents chloramine from the generator over a period of 59 minutes. After gasification was stopped, the temperature of the mixture rose abruptly. About 15 g. of a reddish brown paste, melting at 195–198° C. with sublimation, was obtained. This crude product was extracted with ethyl alcohol to give about 10.9 g. of 1,1-dimethyl-1-(p-phenylazophenyl)hydrazinium chloride; a tan product turning yellow at about 130° C. and decomposing at about 195° C. It was very soluble in water and partially soluble in chloroform. It formed a tan hexafluorophosphate decomposing about 200° C. when treated with potassium hexafluorophosphate. The product no longer showed the acid base indicator color change characteristic of the parent compound.

(17)

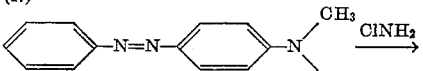

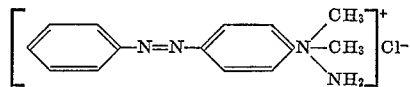

EXAMPLE CX 25 g. of Dipyrone, the commercially available antipyretic of the formula

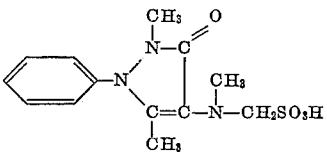

in 250 ml. of water was treated with 2.1 equivalents of chloramine from the generator for 82 minutes. The reaction was markedly exothermic; even with a water bath the temperature rose to 38° C. The solution became a light cherry red. Upon evaporation to dryness, 33 g. of a light tan solid was obtained. Tedious extractions with methanol, isopropyl alcohol, chloroform and dimethylformamide gave a low yield of tan product decomposing at about 183° C. It was soluble in water and acted as a strong reducing agent in neutral $KMnO_4$. It formed a dark yellow picrate decomposing at about 140° C. when treated with the appropriate reagent.

EXAMPLE CXI 25 g. of the commercial local anesthetic Amylocaine (also called Stovaine), chemically (2-methyl-2-benzoyloxybutyl)dimethylamine hydrochloride, in 250 ml. of water was converted to free base by a procedure similar to that described in Example XC. The base was dissolved in chloroform and reacted with 3.1 equivalents of chloramine gas over a period of 65 minutes. The reaction was strongly exothermic and a water bath was used to maintain the temperature at 30° C. The resulting product consisted of viscous oil and solid. The 6.5 g. of precipitate appeared physically as fine white crystals subliming at about 175–180° C. They comprised about a 1 to 1 mixture of ammonium chloride and 1,1-dimethyl-1 - [(2-benzoyloxy-2-methyl)-butyl-1-1hydrazinium chloride. The amount of hydrazinium chloride thus obtained represented 13.9% of the theoretical yield. Evaporation of chloroform from the combined filtrate and wash yielded 15.5 g. of a pasty grey solid as additional crude product (melting at approximately 100–105° C.) mixed with starting amine. The overall yield of combined product was 45% of theory. Recrystallization from isopropyl alcohol gave off-white hygroscopic crystals, melting point 118–120° C.

EXAMPLE CXII 25 g. of the antihistamic drug, Histadyl (also called Methapyraline or Thenylene) suspended in 50 ml. of water and 100 ml. of xylene was treated with 20 ml. of sodium hydroxide. The water insoluble precipitate was redissolved in xylene, separated and the aqueous layer reextracted with 50 ml. more of xylene. The combined solutions were extracted, dried over magnesium sulphate and reacted with about 0.25 equivalent of chloramine from the generator. A plastic brown product formed rapidly which had a tendency to block the gas inlet tube, in turn resulting in a reduction of the contemplated reaction time. 4.1 g. of product, representing 82% of the theoretical yield of 1,1-dimethyl-[2-(α-N-thenylpyridylamino)ethyl]hydrazinium chloride was obtained as an intractable hygroscopic solid.

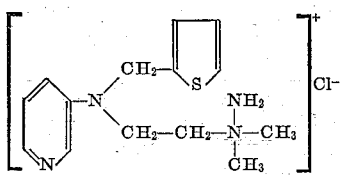

EXAMPLE CXIII

A series of detergents and detergent additives, available commercially as "Tetronics," are made by reacting ethylenediamine with an excess propylene oxide to the desired point of water-insolubility and then with an excess of ethylene oxide to the desired state of water dispersibility. The product "Tetronics 704," a viscous, inhomogeneous, light tan oil, was made by oxypropylating ethylenediamine to a mixture of water-insoluble homologs having an average molecular weight of about 2700 (i.e., $m=$about 11 in the first reaction) then reacting with ethylene oxide until the oxyethyl group ($n$, second reaction) made of about 45% of the molecular weight of the product (see Equation 18) below:

(18)
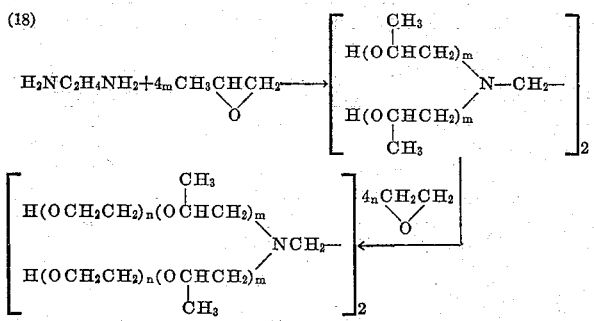

EXAMPLE CXIV

"Tetronics 701," similar in appearance to 704, is made by treating a polyoxypropylated ethylenediamine of molecular weight of about 2700 with ethylene oxide to a molecular weight of approximately 3300 (i.e., about 18% oxyethylene content). 100 g. of this base were dissolved in one liter of a high boiling aromatic solvent (ca. 150–175° C.) available commercially as "Solv D." This solution was treated with a chloramine-ammonia-nitrogen gas stream from the generator delivering approximately 0.006 mol of chloramine per minute for 36 minutes. The reaction mixture was allowed to sit overnight and subsequent filtration gave 11 g. of an air-dried fluffy white solid which, by analysis, was 90% pure ammonium chloride. Titration of the combined filtrate and wash showed it to contain approximately 10% yield of product dissolved in solvent plus unreacted base. The solvent was thereafter stripped off leaving a relatively fluid, light brown oil weighing 107 g. (representing approximately a 10% solution of the product in the parent amine). After being chilled and allowed to stand, this oil gave a white, waxy semi-solid, melting indefinitely at 49–63° C. The product contained 0.91% chloride as titrated by the standard Volhard procedure. It was soluble and dispersible in ethyl alcohol, carbon tetrachloride and "Solv D."

EXAMPLE CXV

Ethylenediamine, treated with excess propylene oxide, gave a water-insoluble clear yellow, viscous oil, generally called Tetronics Base, which is a mixture of homologous tetra(poly-2-oxypropyl) ethylenediamines having an average molecular weight of about 1800. This base, as a 10% solution in "Solv D," was reacted with a 5-fold excess of chloramine from the generator. Filtration gave at least a 50% of theory yield of ammonium chloride, 90% pure. The filtrate was evaporated, and the residue was triturated alternately with hexane and ether to give 46 g. of a clear, viscous, light brown oil, 69% pure, 1,1 - bis - (polyoxyisopropyl)-1-[2-(bis-polyoxyisopropyl) aminoethyl] hydrazinium chloride. This product was more soluble in water than the starting base. Aqueous solutions gave a precipitate with detergent sulfonates such as Nekal; such a result does not obtain using an emulsion of the "Teronics" base in water.

EXAMPLE CXVI

Tetra-2-hydroxypropylethylenediamine, commercially available as Quadrol, is a very viscous, colorless oil. 52.3 g. of this oil were dissolved in 1000 ml. of chloroform and subjected to treatment for one and a half hours with 0.0052 mol of chloramine per minute from the generator. After the treatment had continued for about 5 minutes, a precipitate formed. Active chlorine disappeared from the reaction mixture within 2 hours after gasification. The reaction mixture was filtered, washed with two 100 ml. portions of chloroform and then with dimethylketone. It was extracted free of ammonium chloride with isopropyl alcohol. On evaporation to dryness 20 g. of 97% pure hygroscopic, clear, brown, tacky gum identified as 1,1 - bis - (2 - hydroxypropyl)-1-[2-(bis-2-hydroxypropylamino) ethyl] hydrazinium chloride were obtained. From the ketone wash, residue left behind in the reactor and filtrate was obtained and an additional amount of less pure product giving a total yield of 68.3% of theory.

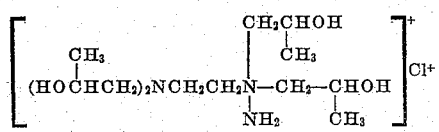

In pyridine solution, the novel salt forms infusible polymers with polyisocyanates.

EXAMPLE CXVII

A commercially available product known as "Quadrol Monooleate" is made by esterfying Quadrol (see Example CXXII) with 1 equivalent of oleic acid. The thick brown oil, 47.6 g. in 1000 ml. of Solvent D, was reacted with generator chloramine, allowed to stand overnight, and then filtered. The pasty filtration residue was washed with Solvent D, air-dried, and then extracted with two 200 ml. portions of acetone, leaving 16.3 g. (air-dried) soft tan solid. This was by analysis a 65% NH₄Cl and 35% 1,1-bis-(2-hydroxypropyl)-1-[2-(β-oleoyloxypropyl-β-hydroxypropyl)aminoethyl] hydrazinium chloride. The reaction filtrate was evaporated dry giving 48 g. of a dark viscous oil, chiefly base and product in a 70:30 ratio. This was treated with the acetone wash of the filtration residue, stirred, and decanted. It was washed by decantation with three additional 100 ml. portions of acetone. The air-dried brown residue thereby obtained was mixed with the extracted filtration residue to give 22 g. of chloroform-soluble, light brown hydrazinium chloride. It was washed free of ammonium chloride by use of aqueous potassium carbonate, leaving a brown semi-solid product 86% pure by analysis.

EXAMPLE CXVIII

A product similar to the starting amine of Example CXVII, available industrially as "Quadrol Dioleate," is presumably a mixture containing the diesters:

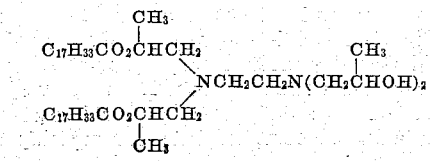

and

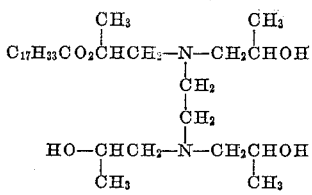

The commercial mixture, 50 g. in 1000 ml. chloroform, was reacted with chloramine and worked up essentially as described in the preceding example. Approximately 90% of the crude hydrazinium chloride was found to be in the filtrate. Once stripped of solvent, this product was dark brown, viscous oil, weighing 51.7 g. and analyzing as about a 58:42 mixture of unreacted base and hydrazinium chloride. Free base was removed by repeated trituration with ether, leaving the desired product as a dark brown semi-solid mixture, one of the chief components of which was probably 1-(2-oleoyloxypropyl)-1-(2 - oxypropyl) - 1 - [2 - (N-2-oleoyloxypropyl-N-2-oxypropyl)aminoethyl] hydrazinium chloride.

EXAMPLE CXIX 20 g. of 4-dimethylaminoethyl antipyrine were dissolved in chloroform and treated with 8.5 g. of chloramine from the generator over a period of 30 minutes. The reaction mixture became immediately turbid and within one half hour after gasification was stopped, no active chlorine was present. The mixture was filtered and the precipitate obtained therefrom was washed with three 100 ml. portions of chloroform. It was dried to yield a 4 g. mixture containing about 9 parts ammonium chloride to 1 part product. Evaporation of the combined wash and filtrate yielded 27 g. of brown crystals which were 86% pure hydrazinium chloride. Upon heating they turned dark red evolved gas, and melted at 148–151° C. The product thus obtained was 1,1-dimethyl-1-(antipyrinyl-4-methyl) hydrazinium chloride of the structural formula:

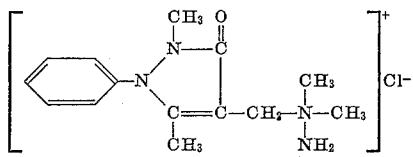

EXAMPLE CXX

The procedure of Example CXIX was substantially repeated using a chloroform solution of 4-pyrrolidinomethylantipyrine. 32 g. of product in the form of light tan prisms were obtained from the reaction mixture. The prisms melted at 93–95° C. and turned dark with evolution of gas at 120° C. Evaporation of the filtrate yielded an additional 3 g. of a very crude product. The total product represented 85% of theoretical yield of 1-amino-1-(antipyrinyl-4-)methylpyrrolidinium chloride:

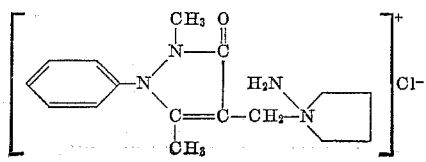

EXAMPLE CXXI 10 g. of N,N-1-bis-(antipyrinyl-4-methyl)piperazine in a solution of chloroform were subjected for 15 minutes to the chloramine-ammonia gas stream. 7 g. of a brown and slightly tacky precipitate were obtained from the reaction mixture; this precipitate was a mixture of about 2 parts ammonium chloride to 1 part product. Evaporation of the filtrate and subsequent wash gave, after work-up, a 7 g. mixture of unreacted amine, and the piperazinium salt. Purification by water precipitation and ethanol extraction gave 42% of the theoretical yield of a soft off-white product, 1-amino-1-(antipyrinyl-4-methyl)-4-(antipyrinyl-4-methyl) hydrazinium chloride, melting at 135° C. with gas evolution. The structural formula of this product is shown hereunder:

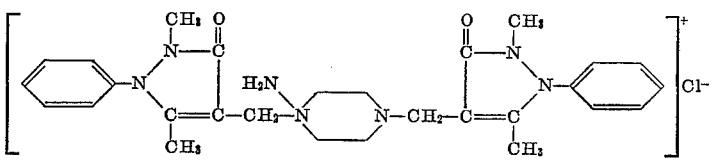

EXAMPLE CXXII 30 g. of atropine sulfate were dissolved in 150 ml. of water and 10 g. of sodium carbonate were added thereto. This solution was shaken with 100 ml. of chloroform, separated, and reextracted with 150 ml. of chloroform. The combined extract was dried for two hours over magnesium sulfate and an additional amount of chloroform was added to bring the total volume up to 1 liter. The 1 liter solution was treated with 1.1 equivalents of chloramine from the generator over a period of 15 minutes. The reaction mixture became immediately cloudy. The precipitate obtained therefrom was 85% pure product, N-aminoatropinium chloride, obtained in a fair yield as an off-white solid which was soluble in water and ethyl alcohol. It melted at 231° C., and formed a hexafluorophosphate melting at 145° C. The structure of the hydrazinium chloride is shown below.

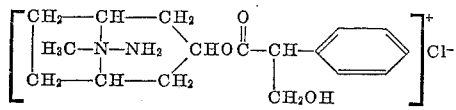

EXAMPLE CXXIII 20 g. of 1-methyl-3-hydroxymethylpiperidine were dissolved in 100 ml. of xylene. This solution was treated with 1.8 equivalents of chloramine from the generator over a period of 90 minutes. The hydrazinium salt precipitated from the reaction mixture in early quantitative amounts (i.e., after filtration the filtrate contained very little starting base). The product obtained from the reaction mixture formed initially as a crystalline solid, but on exposure to air it changed to a sticky brown resin. Trituration with diethylether followed by extraction with cold isopropyl alcohol gave, on vacuum drying at 25° C., a tacky amber resin. On analysis, this resin was found to contain 98% product and 2% ammonium chloride. It was extremely water-soluble and formed crystalline picrates and hexafluorophosphates when treated with the appropriate reagent. The product, 1-amino-1-methyl-3-hydroxymethylpiperidinium chloride has the formula:

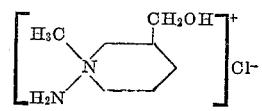

EXAMPLE CXXIV 28 g. of agricultural grade terramycin were dissolved in 1250 ml. of chloroform. The solution was treated with 3 equivalents of chloramine over a period of 30 minutes. Almost immediately a dark brown precipitate formed.

Filtration of the reaction mixture gave nearly quantitative yields of a dark brown solid which by analysis was about 93% monochloramine adduct and 7% ammonium chloride. The adduct presumably had the formula:

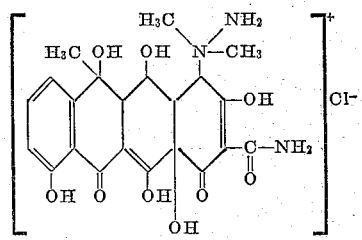

It remained unmelted at 260° C. It was insoluble in water, isopropyl alcohol, methanol, ethyl acetate and chloroform. It was slightly soluble in boiling water, sodium hydroxide and HCl. It formed, when treated with the appropriate reagents, a very high melting hexafluorophosphate and picrate.

EXAMPLE CXXV 25 g. of Quinacrine hydrochloride were dissolved in 400 ml. of water. This solution was treated at 50–60° C. with 12 g. of sodium carbonate and 25 ml. of water. It was extracted, cooled with two 200 ml. portions of chloroform. 100 more ml. of chloroform was added thereto and the mixture was dried over magnesium sulfate for one hour. Additional chloroform was added to make up the total volume of the solution to 800 ml. This solution was treated with about 0.31 mols of chloramine from the generator over a period of about 60 minutes. The mixture gave as a precipitate 10 g. of yellow crystals containing ammonium chloride and the product, 1,1-diethyl-1-[(4-(2'-chloro-7'-methoxyacridino-5'-amino)amyl-1)]hydrazinium chloride, having the formula:

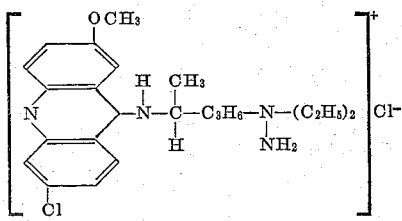

Evaporation of the filtrate gave 25 g. of red paste; a crude mixture of product, by-products and unreacted amine. Trituration with acetone and ether, charcoaling and other standard procedures gave a 42% pure product appearing physically as dull green yellow crystals.

EXAMPLE CXXVI 50 g. of Novalketone in one liter of xylene was treated with 1.6 equivalents of chloramine from the generator over a period of 30 minutes. 16 g. of a yellowish-green solid appeared as a precipitate. The product melted at 167–169° C., and showed the ketone function by forming water-insoluble dinitrophenylhydrazone, melting above 200° C.

EXAMPLE CXXVII 10 g. of pure Crystal Violet in 500 ml. of water was converted to the carbinol by addition of 5 g. of sodium hydroxide in 25 ml. of water. This solution was extracted with two 50 ml. portions of chloroform, then with 150 ml. of chloroform to give a deep blue solution. After drying the solution over magnesium sulfate, it was subjected to 5.8 equivalents of chloramine from the generator over a period of 90 minutes. During the reaction some heat was evolved. The solution changed from blue to red to orange to yellow-orange. 6.9 g. of yellow-orange precipitate subliming at about 140° C. was obtained therefrom. This material was soluble in water and chloroform. It turned deep green on addition of acetic acid or very limited quantities of HCl. By analysis its was determined to be a mixture of 1 part ammonium chloride to 2 parts of product and its hydrochloride was presumably

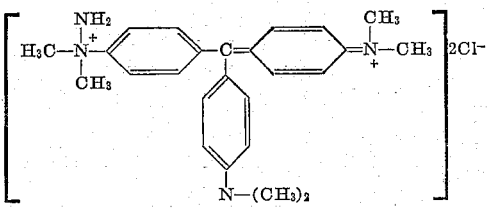

The product formed with addition of potassium hexafluorophosphate was a light green hydrazinium fluorophosphate decomposing at about 187–189° C. Evaporation of the filtrate gave a deep blue tacky resin weighing 6.1 g. It had no definite melting point. It was determined to be a mixture of unreacted Crystal Violet, the hydrazinium salt and the bis-chloramine adduct. Chloroform extraction and acetone precipitation gave an overall yield of 42% of theory of the mono-adduct and 6% yield of the di-adduct. The di-adduct formed a hexafluorophosphate salt melting at 115–120° C.

EXAMPLE CXXVIII 50 g. of ethylcarbazole were dissolved in one liter of "Solv D." This solution was treated with a twofold excess of chloramine from the generator to give a low yield of 9-amino-9-ethylcarbazolinium chloride, having the formula:

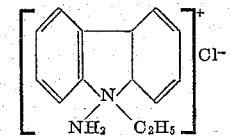

The fine white solid, melting above 210° C., was determined to be 85% pure.

EXAMPLE CXXIX 25 g. of dimethylaminoethylacrylate and 1 g. of hydroquinone (to inhibit polymerization) were dissolved in 1 liter of chloroform. This solution was treated for one hour with a five-fold excess of chloramine from the generator. A very small amount of crude 1-dimethyl-1-[2-(acryloyloxyethyl)]hydrazinium chloride mixed with about an equal amount of ammonium chloride precipitated from the reaction mixture. Work-up of the evaporated filtrate gave 15 g. of a thick tan oil, which was largely product. The hydrazinium salt product was soluble in water, isopropyl alcohol and chloroform. It was insoluble in hexane and diethylether.

EXAMPLE CXXX 33 g. of pure toluene-2,4-diisocyanate in 100 ml. of chloroform were treated with 30 g. of methyldiethanolamine. Considerable heat was evolved during the addition step. The solution was refluxed for one-half hour and then evaporated on a steam bath to give a gray white solid. This was washed first with n-pentane to remove unreacted diisocyanate and then with water to remove the unreacted methyldiethanolamine. It was subsequently redissolved in 1000 ml. of chloroform, dried with magnesium sulfate and treated with 1.6 equivalents of chloramine from the generator for a period of over 2 hours. Immediate precipitation resulted upon chloramine addition. Filtration of the mixture after the reaction gave a hydroscopic white paste which, after washing and vacuum drying, weighed 84 g. The tacky cohesive hydroscopic polymer contains the structural unit:

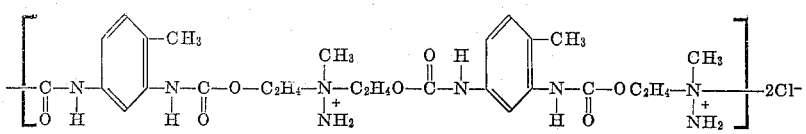

It was slowly soluble in cold water and less so in isopropyl alcohol. It was insoluble in chloroform, xylene and n-heptane.

EXAMPLE CXXXI

The product of Example CXXX was treated in aqueous solution with potassium hexafluorophosphate to give a granular white solid going soft under pressure at 150–156° C. and hardening and darkening at about 200° C. Treatment of the product of Example CXXX with aqueous picric acid yielded a yellow amorphous solid softening at 125° C. and decomposing at about 215° C.

EXAMPLE CXXXII

"Amberlite IR-45" (a weakly basic polyamine-polystyrene anion exchanger) was methylated according to U.S. Patent No. 2,732,352, issued to K. Gray et al., using the free base (formed from 86 g. of Amberlite salt), 192 g. of formic acid and 133 g. of 40% formaldehyde. The mixture was refluxed for 6.5 hours. The product was then converted to free base with sodium hydroxide solution. It was washed free of sodium hydroxide with deionized water and vacuum dried to give 89 g. of tertiary amine resin. This material was suspended in 1000 ml. of chloroform (600 more added during the reaction), and treated for 3 hours with the chloramine from the generator at a rate of 0.005 mol of chloramine per minute. The reaction mixture was filtered, washed with chloroform and vacuum dried. The dull yellow granules thus obtained were rewashed, first in deionized water, then with dilute sodium hydroxide, and redried to give 70 g. of product. The vacuum dried product contained 6.4% of chloride ion as determined by a slow precise Volhard measurement, thus indicating an equivalent weight of 527 (which in turn means, assuming complete methylation, incomplete chloramination). The product functions as an excellent ion exchanger. If the structure of the methylated base is, as suggested in the literature, cross-linked polystyrene-containing dimethylaminomethyls, then the hydrazinium portion of the product is shown in the formula below:

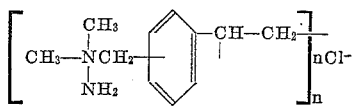

On semi-micro and micro-preparative scale I have shown that chloramine adds to the following adidtional tertiary amines, yielding products whose structures have not yet been established:

*Table I*

ADDITIONAL CHLORAMINE ADDUCTS

| Example Number | Amine | Comments |
|---|---|---|
| CXXXIII | Hyoscyamine | Used hyoscyamine sulfate. |
| CXXXIV | Lobeline | Used hydrobromide. |
| CXXXV | Pilocarpine | Poor yield, very largely $NH_4Cl$. |
| CXXXVI | Emetine | Used hydrochloride. |
| CXXXVII | Eserine | Used sulfate. |
| CXXXVIII | Scopolamine | Used hydrobromide. |
| CXXXIX | Thephorin (2-methyl-9-phenyl-2,3,4,9-tetrehydro-1-pyridindene). | Used hydrogen tartarate. |
| CXL | Sparteine | Used sulfate. |
| CXLI | Homatropine | Used hydrobromide. |
| CXLII | Ergot | Complex mixture, fat free. |
| CXLIII | Artane | Good yield on mixing $CHCl_3$ solutions. |
| CXLIV | Adiphenine (2-diethylaminoethyl diphenylacetate). | Used hydrochloride. |
| CXLV | Aureomycin | Product similar to terramycin. |
| CXLVI | Corynanthine (an isomer of yohimbine). | Product chloroform soluble. |

*Table I—Continued*

| Example Number | Amine | Comments |
|---|---|---|
| CXLVII | Tetracycline | Used hydrochloride. |
| CXLVIII | Yohimbine | Do. |
| CXLIX | Thorazine (3-chloro-10-(3-dimethylaminopropyl) phenothiazine). | Poor reaction. |
| CL | Reserpine | Chloroform-soluble product. |
| CLI | Auramine | Used hydrochloride. |
| CLII | Polyethyleneimine | Used aqueous solution, product water-soluble. |
| CLIII | Procaine Amide | Similar to Procaine. |
| CLIV | Bentyl (diethylaminoethyl 1-cyclohexylhexahydrobenzoate). | Used hydrochloride. |
| CLV | Caramiphen (2-diethylaminoethyl 1-phenylcyclopentanecarboxylate). | Used hydrobromide. |
| CLVI | Leuco Crystal Violet | Oxidizable to blue dye. |
| CLVII | Pavatrine | Product chloroform-soluble. |
| CLVIII | Cinchonine | Product chloroform-soluble, like quinine. |
| CLIX | Kephalin | Product detergent oil. |
| CLX | Chloroquine | Like cinchonine. |
| CLXI | Demerol | Oil. |
| CLXII | Methadone | Do. |
| CLXIII | Codeine | Poor reaction. |
| CLXIV | Apomorphine | Product chloroform-soluble. |
| CLXV | Thebaine | Better reaction than with codeine. |
| CLXVI | Polyvinylcarbazole | Dimethylformamide solvent, poor reaction. |
| CLXVII | Poly (dimethylaminoethyl Methacrylate). | Poor reaction. |

From the foregoing discussion and the specific working examples, the great versatility and flexibility of my novel reaction is apparent. In summary, the advantages to be gained from its use are these:

First, I have made available for the first time literally thousands of new compounds, the utility of which will be discussed hereafter. I have already indicated that prior art practitioners were almost totally dependent upon difficult and hard to obtain substituted hydrazines to use as reactants for the preparation of hydrazinium salts. Many of the hydrazinium salts prepared by my reaction, e.g., the bridgehead nitrogen compounds, brucine, and hexamethylenetetramine and the like, can be made by no other known method.

Second, my reaction operates effectively over a wide range of temperatures. For this reason, it is readily adaptable to commercial operations since expensive refrigeration and specially insulated equipment are not required.

Third, my reaction is operable at atmospheric pressure and pressures upwardly therefrom. In general, special pressurized equipment is not required for my reaction.

Fourth, since no particular control is required over the stoichiometry of my reaction, the use of expensive automatic control equipment for commercial operation is obviated. In addition, my method has this advantage; it can be operated, in general, using an excess of the cheapest reactant. In other words, if the amine is expensive and the chloramine relatively cheap, a large excess of chloramine can be used. If the opposite condition obtains, the amine itself can be used as a solvent for the reaction, thus facilitating continuous operation.

Fifth, the utility on the compounds produced by my reaction has already been established for medicinal, pharmaceutical, surfactant, and polymerization purposes. The following discussion will clearly indicate the type of utility posessed by hydrazinium salts of various characteristics. Obviously, I have not attempted to ascribe a use to each specific compound. Volumes could be written on this subject, but endless repetition would serve no purpose. It is apparent to one skilled in the art that the utility of organic compounds is predicated on their structural characteristics. As a general rule, it can be stated that the chainlength, choice of substituent, and structural linkage are the controlling factors. Compounds possessing related characteristics will have similar utility. It must be remembered, of course, that general propositions do not control each specific case. Certain compounds possess unobvious utility; remarkable effectiveness for a given purpose may obtain through the peculiar nature of a specific compound or group of compounds. Bearing these principles in mind, I have attempted to explain by showing both specific and generic illustrations, the vast utility of the hydrazinium salts. Where I have spoken in specific terms, I am not unmindful that some related salts will possess the same utility to a greater or lesser degree. In following my discussion, the reader is invited to recall the physical properties of each of the hydrazinium salts thoroughly discussed in the working examples. I also wish to call attention to the helpful and specific discussion of utility for the novel compounds of which I am the inventor given in my co-pending application S.N. 582,657 entitled "New Hydrazinium Salts," filed May 4, 1956.

Specific and general medicinal and pharmaceutical uses are as follows. The trimethyl and triethylhydrazinium chlorides have been shown to be equal to and competitive with the tetraethylammonium chloride in their effect upon the animal nervous systems. Similarly, the dimethylacetoxyethylhydrazinium cation and the dimethylcarbomethoxyethylhydrazinium cation have been found to be at least the equal of acetylcholine. The decamethylene-1,10-bis-dimethylhydrazinium chloride has been reported as a potent curarimimetic. Benzhydryloxyethyldimethylhydrazinium chloride is 2 to 4 times more active by aerosol tests an antihistamine than Benadryl. Dimethylphenylcyclohexylacetoxyethylhydrazinium chloride is 75 times more effective as an anti-spasmodic than "Propavan," a commercial compound available for this use. Generally speaking, chloramination of a substituted alkyldialkylamine enhances its neuro-therapeutic properties. A specific illustration of this behaviour is shown by the chloramine adduct of procaine. Pharmaceutical utility does not imply equivalence between substituent groups. In other words, the aforementioned benzhydrylhydrazinium salt, for example, has an anti-spasmodic effect that the decamethylene compound lacks; on the other hand, this latter compound is a powerful curarimimetic while the Benadryl analogue is not. Even when the same general physiological effect is produced by structurally different hydrazinium compounds, they are usually not equivalent because of marked differences in therapeutic dose range, tolerability range and extent of concomitant effects, ease of compounding, and availability; to mention a few of the variable factors. Surprisingly, chloramination of alkaloids containing no basic side chain appears, in general, not to change the types of physiological effects shown by the alkaloids. Thus, quaternization of the atropine nitrogen gives a product showing the same mydriatic effects, but having marked advantages. Atropine, given as a solution of e.g. its sulfate cannot be used in the presence of even weak bases, since these will convert the water-soluble acid salt to the water-insoluble free base. The chloramine adduct of Atropine is not converted to a water-insoluble form by the action of the therapeutically useful bases. It is also far more compatible with therapeutically useful acids. The quaternization of the amino group has been shown to reduce its toxicity. Aureomycin is generally used in solution as the hydrochloride; this is a strongly acidic solution (pH 2.8) which on even partial neutralization with a weak base such as sodium carbonate precipitates the less readily utilized free base. The adduct made by my novel reaction is as water-soluble at pH 6 as it is at pH 3. It is also less susceptible to loss of potency by air oxidation.

Many of the chlorides made by my novel chloramination technique are not only useful pharmaceuticals, but are useful intermediates in the preparation of other pharmaceuticals. It is obvious to the synthetic organic chemist that the neurally effective compound 1,1-dimethyl-1-(2-acetoxyethyl)hydrazinium chloride can be prepared not only by chloramination of dimethylaminoethylacetate, but also by direct acetylation of the simple, readily obtainable 1,1-dimethyl-1-(2-hydroxyethyl)hydrazinium chloride. Nor are such useful pharmaceutical syntheses restricted to the simpler quaternized hydrazines. For example, the chloramine adduct of the analgesic aminopyrine is not only an analgesic itself, but reacts with the analgesic-antipyretic aspirin to form a salt with these valuable properties. This reaction is shown hereunder in Equation 19.

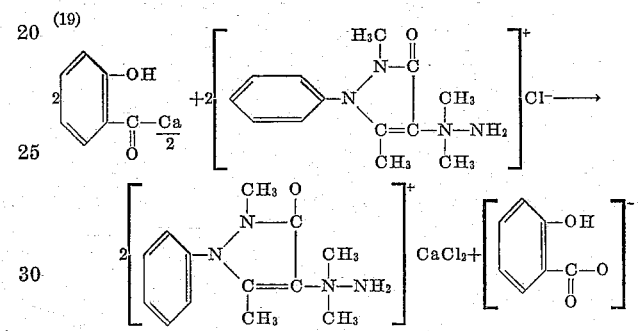

The commercially available procaine salt of penicillin is much less stable to hydrolysis by pH variation than is the corresponding salt of penicillin and the procaine-chloramine adduct. Other hydrazinium salts made available by my novel method are in themselves excellent bacteriocides and fungicides. For instance, the hexadecyldimethyl hydrazinium ion, in aqueous solution is effective against lactic acid bacteria in concentrations of less than 1:1,000,000. Compounds containing the octaphenoxyethoxyhydrazinium ion also respond with excellence when subjected to bacteriostatic tests. The aminotallowmorpholinium chloride is even more effective than the hexadecyldimethyl salt when tested by the Oxford cup technique against common bacteria and fungi. The chloramine adduct of hexamethylenetetramine has effective fungicidal properties. The Polyrad adducts, especially when converted to the nitrophenate salts, are excellent mold and slime inhibitors. Hydrazinium salts of sulfa drugs, prepared by metatheses of the proper salts, are water-dispersible, solvent-soluble antimicrobials. For example, the 1,1-dimethyl-1-octadecylhydrazinium salt of sulfathiazole, prepared according to the reaction of Equation 20:

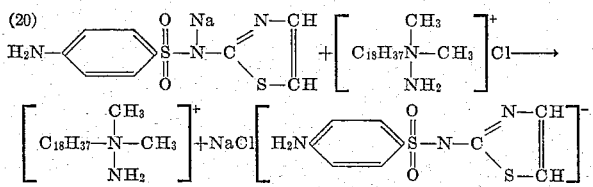

is superior to the commercial disinfectant Zephiran, as measured by the Oxford cup technique.

The surface active hydrazinium salts have diverse application. In the textile field they are useful as spinneret cleansers, anti-static agents, textile softeners and leveling and stripping agents. The polyurethane hydrazinium salt of Example CXXXI shows excellent anti-static properties. The alkyl-hydroxyalkyl compounds of the type derived from the Ethoduomeens have the properties of good leveling and stripping agents. The long chain alkyl compounds, e.g., hexadecyldimethylamine, when mixed in small quantities with acetate dope, are excellent for keeping spinnerets clean. In the field of softening agents the dihydrogenatedtallowmethylhydrazinium chloride is as good or better than any known commercial softener. All softening agents possess a somewhat similar chemical structure. Ordinarily they comprise a molecule made up of a hydrophobic group, usually derived from a median chain alkyl source (e.g., a carbon chain of $C_8$–$C_{24}$) and a solubilizing, or hydrophilic group. The hydrophilic group may be a quarternary structure like that characteristic of salts made from my novel process. Softness (or hand, as it is known in the textile trade) can be effectively imparted to most fabrics by treating them with a dilute water solution of the long chain alkyl hydrazinium chlorides. A treating bath comprising about 0.2 to 0.4% by weight of softener solids based on the weight of cloth and water equivalent 20 times the weight of the fabric is sufficient for this purpose. The bath is generally preheated to a temperature of 115° F. to 125° F. The fabric is placed therein and agitated for a short period of time during which the softener exhausts from the bath onto the fabric. The fabric is subsequently dried and steam-pressed. Even the harshest of fabrics, treated by this process with an effective softener acquire a soft, plump hand reminiscent of wool or cashmere. Unlike other commercial softeners, these novel salts can, by virtue of its greater resistance to alkaline degradation, be used as a household softener directly with the detergent formulation. Commercially available household textile softeners cannot be used in the presence of relatively strongly alkaline formulations. This means that the busy housewife must, after starting her automatic washer, leave her other chores to return to the washer just before it has started the final rinse, and add the softener, then return to her other work. Hydrogenated ditallowmethylhydrazinium chloride, however, can be used effectively at the beginning of the wash, even premixed with detergent. In fact, the hydrazinium salts themselves are among the most effective cation-active detergents known.

Another remarkable use for the surfactant type hydrazinium salts is as a detergent additive to soap to impart germicidal and anti-oxidant action thereto. They may be added in small quantities usually from about 0.5 to 5% directly to a batch of clothes being laundered or alternatively they may be incorporated as an additive to any anionic, cationic or nonionic soap.

The surfactant hydraziniums, as their name would imply, are also excellent emulsifiers and dispersants. The lower Ethomeen adducts, for example are excellent emulsifiers. The hydrazinium salts of crop control acids such as 2,4-D and anti-putrifacients (e.g. pentachlorophenol), as well as the simpler hydrazinium chlorides themselves are excellent emulsifiers and synergists for such uses. The octadecyldimethylhydrazinium salt of sulfathiazole is a water and fat dispersible bacteriocide and antiseptic. Examples LXVIII, CXIV, and CXVII, give good non-sudsing detergent acids, and resoil preventers. Foamers like that of Example XCII are especially good in froth flotation, as are the Ethoduomeens which have less of a tendency to form but are more strongly adsorbed on $SiO_2$ and gangue. For this reason, they are more economical for froth flotation of siliceous material. Surfactant hydrazinium salts of acid dyes are readily useful as readily flushable pigments, e.g. the Ethomeen 18/12 chloramine adduct salt of Peacock Blue Lake is very readily flushed to bright color, more resistant to the action of sunlight and air, than the product lacking adduct. Most of the surfactant hydrazinium compounds are good corrosion inhibitors for iron and steel. This is especially true when the hydrazinium compounds are converted from the chloride to the citrate or gluconate. When added in small quantities to pickling baths, their effect as inhibitors becomes marked.

Many of the hydrazinium salts, noticeably the "Tetron-ics" derivatives are useful in electroplating. For instance, the addition of a small amount of one of these compounds to an electroplating solution results in the deposition, of a clearer, brighter, more coherent covering film on the electroplated object. Moreover, compounds of this nature are excellent dispersing agents for water-insoluble components in electroplating. The combination of anti-bacterial and surface active properties makes many of the hydrazinium salts useful as detergent sanitizers. Notable among these are the octaphenoxyalkoxylower alkyl dialkylhydrazinium salts and the compounds with one or two median alkyl groups, like those of Examples XVIII and XLVII. Such compounds are also useful as lube oil additives, giving detergent and antioxidant effects.

The hydrazinium chlorides are useful in many aspects of polymer manufacture. Some of the lower alkyl compounds, e.g., trimethylhydrazinium iodide (precipitated in quantitative yields by treating the hydrazinium chloride with potassium iodide) have been placed in "a preferred class of free radical polymerization catalysts." See U.S. 2,405,950. Other patents testify to value as polymerization initiators. Surfactant hydrazinium compounds like the tallowmorpholine hydrazinium salt combine their emulsion properties with value as polymerization initiators to make them useful in emulsion polymerization. The added anti-oxidant effect of the N—NH$_2$ makes them even more valuable. The phenyldimethyl hydrazinium chloride and related compounds which are water-soluble, alkali-stable and oxygen-stable are useful in photographic work. The cycloalkyl and aralkyl type compounds have been shown to be useful salt formers. One special application of this property is the employment of dyes in the coloring of lacquers, varnishes and similar non-aqueous media, which has been discussed to some extent previously.

The hydroxyalkyl derivatives are useful intermediates for many purposes. Formation of metal-oxygen bonds has been shown to yield valuable additives. Thus the product obtained from titanium tetrachloride in 1,1,1-tris-(2-hydroxyethyl)hydrazinium chloride which is identical to the product of Example LXXXIII yields polyurethane resin, and polyester resins of great enhanced heat stability. (See Equation 21 below.)

(21)

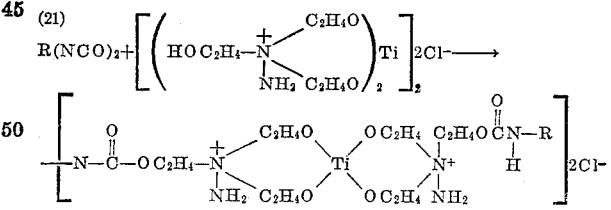

Many such polymers are strong ion exchangers, i.e. on treatment of a suspension say aqueous sodium sulfate, they will form water-soluble sodium chloride and water-insoluble polymer sulfate. Ion exchange resins derived from polymeric hydrazinium salts are more resistant to the action of hot alkali than those derived from quaternary ammonium salts. For this, and other purposes, the polymers derivable directly from 1,1,1-tris-(2-hydroxyethyl)hydrazinium chloride would be at least as satisfactory as those from its spirotitanium derivative, besides being appreciably cheaper.

The cyano and cyanoalkyl compounds are useful intermediates. For instance the treatment of 1,1-dimethyl-1-2-cyanoethylhydrazinium chloride with aqueous caustic yields 1,1-dimethylhydrazine. This novel reaction offers a new and simple route to the valuable jet and rocket fuel, as well as its homologs.

Among the heterocycles 8-aminonicotinium chloride is found to be a water-soluble light and air stable insecticide, when applied in appropriate quantities. The 2,4-dinitrophenol salt of this novel compound seems to be especially effective for this purpose.

I claim:
1. A method of making organic cation active chlorides having the structural characteristic:

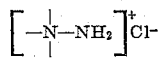

comprising contacting chloramine with a tertiary amine, the amino nitrogen of which is structurally free of steric hindrance sufficient to block the attachment of an amino group thereto without having the three bonds of said amino nitrogen forming in conjunction with two carbon atoms to which they are attached part of an annular structure having alternate single and double bonds, in the presence of at least five moles of ammonia per mole of said chloramine.

2. A method of making organic cation active chlorides having the structural characteristic:

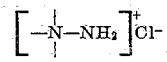

comprising contacting chloramine with a large excess of a fluid tertiary amine, the amino nitrogen of which is structurally free of steric hindrance sufficient to block the attachment of an amino group thereto without having the three bonds of said amino nitrogen forming in connection with two carbon atoms to which they are attached part of an annular structure having alternate single and double bonds, in the presence of at least five moles of ammonia per mole of said chloramine, and recovering said organic chloride from the reaction mixture.

3. A method of making organic cation active chlorides having the structural characteristic:

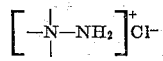

comprising contacting chloramine in aqueous solution with a tertiary amine, the amino nitrogen of which is structurally free of steric hindrance sufficient to block the attachment of an amino group thereto without having the three bonds of said amino nitrogen forming in connection with two carbon atoms to which they are attached part of an annular structure having alternate single and double bonds, in the presence of at least five moles of ammonia per mole of said chloramine.

4. A method of making organic cation active chlorides having the structural characteristic:

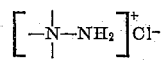

comprising contacting chloramine with a tertiary amine, the amino nitrogen of which is structurally free of steric hindrance sufficient to block the attachment of an amino group thereto without having the three bonds of said amino nitrogen forming in connection with two carbon atoms to which they are attached part of an annular structure having alternate single and double bonds, in the presence of an unreactive organic solvent and at least five moles of ammonia per mole of said chloramine, and recovering said organic chloride therefrom.

5. A method of making organic cation active chlorides having the structural characteristic:

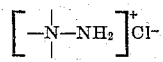

comprising contacting chloramine with a stoichiometric quantity of a tertiary amine, the amino nitrogen of which is structurally free of steric hindrance sufficient to block the attachment of an amino group thereto without having the three bonds of said amino nitrogen forming in conjunction with two carbon atoms to which they are attached part of an annular structure having alternate single and double bonds, in the presence of at least 5 moles of ammonia per mole of said chloramine until all the chloramine in the reaction mixture has been consumed, and recovering said organic chloride from said reaction mixture.

6. A method of making organic cation active chlorides having the structural characteristic:

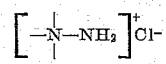

comprising contacting gaseous chloramine with a tertiary amine, the amino nitrogen of which is structurally free of steric hindrance sufficient to block the attachment of an amino group thereto without having the three bonds of said amino nitrogen forming in conjunction with two carbon atoms to which they are attached part of an annular structure having alternate single and double bonds, the mole ratio of said chloramine in contact with said tertiary amine being between 0.5–10 moles of said chloramine per mole of said tertiary amine, in the presence of at least five moles of ammonia per mole of said chloramine, and recovering said organic chloride therefrom.

7. A method of making organic cation active chlorides having the structural characteristic:

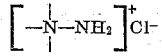

comprising contacting gaseous chloramine with a fluid tertiary amine, the amino nitrogen of which is structurally free of steric hindrance sufficient to block the attachment of an amino group thereto without having the three bonds of said amino nitrogen forming in connection with two carbon atoms to which they are attached part of an annular structure having alternate single and double bonds, in the presence of at least five moles of ammonia per mole of said chloramine at a temperature between −33° C. and 100° C. and recovering said organic chloride therefrom.

8. The method of making 1,1,1-tri-substituted hydrazinium chlorides which comprises reacting a tertiary amine with chloramine in the presence of an excess of ammonia, and recovering said hydrazinium chloride therefrom.

References Cited in the file of this patent

FOREIGN PATENTS 401,302  Great Britain _____ Oct. 30, 1933

OTHER REFERENCES

Omietanski et al.: J.A.C.S., vol. 78, pp. 1211–13 (1956).

UNITED STATES PATENT OFFICE
CERTIFICATE OF CORRECTION

Patent No. 2,955,108                                October 4, 1960

George M. Omietanski

It is hereby certified that error appears in the printed specification of the above numbered patent requiring correction and that the said Letters Patent should read as corrected below.

Column 10, line 29, for that portion of equation (5) reading "$PPF_6$" read -- $KPF_6$ --; column 28, lines 26 to 28, for that portion of the formula reading $\diagdown\!\!\diagup\!\!\!\!\!\underset{\diagup\,\diagdown}{X}i$ read $\diagdown\!\!\diagup\!\!\!\!\!\underset{\diagup\,\diagdown}{T}i$ Signed and sealed this 25th day of April 1961.

(SEAL)
Attest:

ERNEST W. SWIDER                                        DAVID L. LADD
Attesting Officer                                           Commissioner of Patents